(12) United States Patent
Kimbara et al.

(10) Patent No.: US 6,581,448 B2
(45) Date of Patent: Jun. 24, 2003

(54) SNUG FITTING APPARATUS FOR TIRE ASSEMBLY AND MANUFACTURING METHOD OF TIRE ASSEMBLY

(75) Inventors: Toshiyuki Kimbara, Anjo (JP); Junichi Takeda, Okazaki (JP); Takehiro Kawaguchi, Kasugai (JP)

(73) Assignees: Central Motor Wheel Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/813,121

(22) Filed: Mar. 20, 2001

(65) Prior Publication Data

US 2002/0011103 A1 Jan. 31, 2002

(30) Foreign Application Priority Data

Mar. 29, 2000 (JP) ........................................ 2000-091207

(51) Int. Cl.[7] ............................................. G01M 17/02
(52) U.S. Cl. .................... 73/146; 73/146.2; 73/146.5
(58) Field of Search .......................... 73/862.044, 634, 73/485, 7, 8, 9, 146–146.5; 340/442, 445

(56) References Cited

U.S. PATENT DOCUMENTS 4,969,355 A * 11/1990 Doi et al. ...................... 73/146

FOREIGN PATENT DOCUMENTS

| JP | 56034510 | 4/1981 |
|----|----------|--------|
| JP | 2045727  | 2/1990 |
| JP | 2130451  | 5/1990 |
| JP | 5-32009  | 4/1993 |

* cited by examiner

Primary Examiner—Hezron Williams
Assistant Examiner—Jermaine Jenkins
(74) Attorney, Agent, or Firm—Darby & Darby

(57) ABSTRACT

A snug fitting apparatus for improving the finished quality of a tire assembly 1 without sacrificing productivity, including a first pressing member 25 (25a) adapted to be pressed against the ground contact surface F of a tire assembly 1 and a second pressing member 25 (25b) adapted to be pressed against the ground contact surface F to receive the radial reactional force of the ground contact surface F. Measuring device is provided to read variation in the reactional force. As a result, a large, expensive uniformity checking machine is made unnecessary, making it possible to assure quality for all the quantity of tire assemblies 1 on the production line and to fully automate the process.

24 Claims, 25 Drawing Sheets

GRAPH OF CORRELATION FOR RFV
(PRIMARY COMPONENT)

Conventional manufacturing process

SNUG FITTING APPARATUS FOR TIRE ASSEMBLY AND MANUFACTURING METHOD OF TIRE ASSEMBLY

BACKGROUND OF THE INVENTION

This invention relates generally to a snug fitting apparatus for a tire assembly having a tire fitted to a disk wheel for use in automobiles and the like and, more particularly to an apparatus for making the fit between the tire and the disk wheel rim tight.

The tire assembly made by fitting the tire to the disk wheel and being filled with air exhibits slight unbalance in mass distribution due to variation in the tire dimensions, rigidity, weight distribution, true circle accuracy of the disk wheel, and the state of fit between both of the components, which causes vibration and adversely affects riding comfort and maneuverability when a vehicle is driven. Therefore, various measures are taken to solve the problem of the unbalance.

Here, the state of fit between the tire and wheel is settled when air is injected to inflate the tire to a specified shape at the time of assembling the tire.

However, in some cases the air injection only is not sufficient to produce a snug and stabilized state of fit, and unbalance may result. Therefore, a process of correcting the incomplete fit between tire and rim is employed in which a lateral force that can occur during actual vehicle run is applied in advance to the tire assembly to make the fit between tire and rim snug.

As a means for applying the lateral force to the tire assembly, one is proposed (Japanese patent publication No. Sho-64-3683) in which a large diameter drum of normal-and-reverse rotation type with a slip angle is pressed against the ground contact surface of the tire and rotated. The main point of the work of fitting together the wheel and tire is to bring about a normally fit state of the tire assembly with the dummy load before the tire assembly is brought to a stabilized state with the actual load. However, it is generally known through experience that what is practically necessary is not the fit state according to the design theory but a stabilized fit state brought about with the actual load of the vehicle. However, curvature of the roller of the prior art for applying the lateral force is very sharp in comparison with the flatness of the road surface. As a result, the load is not distributed evenly, the pressing force is dispersed around the tire contact area, and the pressing force to the fitting surface is very different from that with the actual vehicle. Moreover, the stresses in the tire is constantly similar to those produced when the tire negotiates a projection on the ground. This sometimes results in that the pressing force does not act on the wheel-tire fit interface.

Another problem with the prior art is a necessity of a device to give swinging motions to the tire so that the lateral force is applied to one and the opposite sides of the tire by turns, which increases the overall size of the correction apparatus.

Therefore, an apparatus has been proposed in a Japanese utility model publication No. 2553192 that is compact, simple, and effective to simulate the actual load very closely by making the pressing surface for applying the lateral force very similar to the ground surface on which the actual vehicle runs. The apparatus is constituted to perform a snug fitting process by pressing the ground contact area of the rotating tire assembly to apply a lateral force to that area. The apparatus comprises a plurality of rollers arranged side by side close to each other with a slip angle to form a set (or a group) of pressing rollers. The rollers as a single set (or a single group) are pressed against the ground contact surface of the tire assembly.

With the above constitution, since the group of pressing rollers is constituted with the plurality of rollers arranged side by side close to each other, a wide pressing surface is formed which is similar to the ground surface on which the actual vehicle runs, and the similar load to that in actual situation acts on the ground contact surface of the tire assembly. Another advantage is that since gaps of a certain size are produced among the rollers, the pressing surface becomes irregular to some extent and is very similar to the irregular road surface, and similar loads to that occurring when the actual vehicle runs act on the tire assembly.

As described above, the snug fitting process apparatus has been proposed with which the ground contact surface moving along its entire circumference of the tire assembly is pressed to improve the snugly fit state between the wheel and tire so that the vibration due to non-uniform fit state between the rim and tire is prevented from occurring. However, since such a process is applied under constant conditions on production lines, the effect of the snug fitting process must be checked appropriately.

The checking work is conventionally made as follows: Samples are taken at specified quantity intervals of the products and the uniformity in the fit state is checked with a uniformity checking machine to determine acceptability of the degree of uniformity. However, such a checking method has the following problems.

First, the uniformity checking machine presses a drum of an outside diameter as large as about 850 mm against the ground contact surface of the tire assembly and measures the magnitude of variation in the radial force (RFV), the magnitude of variation in the lateral force (LFV), and the magnitude of the force in the tangential direction (TFV) of the tire, and the machine is large-sized and expensive. From another aspect, the most important factor in the snug fitting process is the magnitude of the RFV on which the riding comfort and maneuverability largely depend. Therefore, although the uniformity checking machine detects variations in various forces with high accuracy, the measurements can be said superfluous and too much time is taken to obtain the results.

Second, since the check is performed by sampling, the processed state cannot be assured for all the products and the quality is assured only roughly and therefore, reliability is not sufficient. Another problem is that when the RFV value exceeds a specified value, clear determination cannot be made whether the problem is limited to the sampled product or related to the entire quantity, and repeated sampling is required.

Third, since the operator takes a sample at appropriate quantity intervals, transfers it, attaches it to the uniformity checking machine, and tests it in succession, the operator cannot help relying on manual work and bears a heavy work load.

SUMMARY OF THE INVENTION

This invention provides a snug fitting process apparatus for a tire assembly having a disk wheel and a tire fitted thereto, characterized by comprising;

a rotary drive device for rotary-driving the tire assembly supported on a work holding section, a first pressing member for performing a snug fitting process by pressing the ground contact surface of the tire assembly, a second pressing member for coming into pressing contact with the ground contact surface of the tire assembly to receive the radial reactional force of the ground contact surface, a transfer device for transferring each of the first and second pressing members between a pressing contact position where the pressing member is in pressing contact with the ground contact surface of the tire assembly and a position where the pressing member is released from the pressing contact, a pressure detecting means for detecting the reactional force received with the second pressing member in the state of pressing contact, and a process control means for performing in succession; the process of snug fitting by moving the first pressing member with the transfer device and pressing the first pressing member against the ground contact surface of the tire assembly being rotated with the rotary drive device, and the process of measuring the variation in the reactional force with the pressure detecting means by moving the second pressing member with the transfer device and pressing the second pressing member against the ground contact surface of the tire assembly being rotated with the rotary drive device; and performing an RFV judgment based on the reactional force. Using the above constitution, the tire assembly is supported with the work holding section and rotated. The rotary drive device is constituted for example to hold the tire assembly for free rotation with the work holding section and a drive roller is brought into pressing contact with the ground contact surface to transmit rotary force to the ground contact surface. Next, as a snug fitting process, the transfer device presses the first pressing member against the road contact surface of the tire by means of the transfer device. Next, when the snug fitting process is finished, the second pressing member is brought into pressing contact with the ground contact surface and the measurement process is performed. Here, the first pressing member may serve also as the second pressing member. In that case, the first pressing member itself comes into contact with the ground contact surface of the tire assembly to receive the radial reactional force of the ground contact surface. And in the case variation in the reactional force (RFV) is great, it is determined that the snug fitting process is insufficient or the tire or the wheel is not normal.

Here, a proposal is made wherein the transfer device comprises a lock device for making the transfer table immovable, and the process control means comprises a measurement process of pressing and holding the pressing member until a preset reactional force value is detected and, upon detection, making the transfer table immovable, and rotating the tire assembly by operating the rotary drive device to detect with the pressure detecting means the variation in the reactional force.

The above constitution is that the second pressing member is made immovable and pressed against the ground contact surface of the tire assembly. However, it is also possible to constitute that a displacement detecting means is provided to detect the displacement of the tire pressing section, to perform in succession the snug fitting process of transferring with the transfer device the first pressing member and pressing it against the ground contact surface of the tire assembly being rotated with the rotary drive device and the measurement process of pressing the second pressing member with a pressing force made constant with the pressure detecting means against the ground contact surface of the tire assembly and of detecting with the displacement detecting means the displacement of the second pressing member, and to perform the RFV judgment based on the displacement. That is, to maintain the pressing force against the tire constant, it is arranged that the tire pressing section is controlled to move back and forth, and the RFV judgment is performed by measuring the back and forth movement using the displacement detecting means.

A means for judging the uniformity of the tire assembly is proposed wherein the RFV judgment is performed with a peak-to-bottom peak value of the displacement with the pressure acting on the tire made constant. Also proposed is an arrangement wherein the RFV judgment is performed by subjecting to an FFT process the displacement measured with a constant pressure on the tire assembly and by comprehensively considering the n-th component. Further is proposed an arrangement wherein the RFV judgment is performed with a true circular accuracy of a virtual tire shape obtained from the displacement data measured with a constant pressure on the tire assembly. The RFV judgment of the tire assembly with a higher reliability is made possible by using these judgment means singularly or in combination.

It may be arranged that in case the RFV judgment with the process control means results in a reject, the snug fitting process is performed again. In this way, in many cases the variation in the reactional force is reduced and the abnormal state is corrected. The tire assembly subjected to the snug fitting process for the second time is further measured in the measurement process and, if it proves that the RFV has not been corrected, the tire assembly is removed from the production line.

As the first pressing member, a set of plural rollers disposed side by side close to each other and supported for free rotation with a support piece is suitable for use to apply a lateral force to the ground contact surface of the tire assembly by pressing the set of rollers against the ground contact surface of the tire assembly. With this constitution, because of the presence of the slip angle, a lateral force is applied to the ground contact surface of the tire assembly. As a result, the tire and rim are made to fit each other tightly into a favorable state. With the above constitution, since the set of pressing rollers is constituted with the plurality of rollers arranged side by side close to each other, a wide pressing area is formed which is similar to the ground surface on which the actual vehicle runs, and the similar load to that in actual situation acts on the ground contact surface of the tire assembly. Furthermore, since gaps are present among the rollers, the pressing area becomes irregular to some extent and is very similar to the irregular road surface, and similar loads occurring when an actual vehicle runs act on the tire assembly.

Here, a single pressing member may serve as both of the first and second pressing members. In this case, since a single pressing member suffices both of the purposes, the device can be simplified and the cost can be reduced.

The above transfer device may be constituted that; a transfer table to which a pressing member is attached, a feed screw shaft driven for rotation with a servomotor is made to engage with the transfer table, and the transfer table may be stopped at any intended position by controlling the rotation of the servomotor. With this arrangement, the pressing member may be transferred to a position where an optimum pressure is applied to the ground contact surface. When a single pressing member serves as both of the first and second pressing members, the pressing force in the snug fitting process is different from the press-contact force in the measurement process. However, both of the pressures may be easily set with the rotary control of the servomotor.

The above detection means may be arranged that; the tire pressing section is supported to be movable in the direction parallel to movement direction of the transfer table on the transfer table moved in the tire pressing direction with the transfer device, the pressing member is fixed to the tire pressing section, a load cell is held with a radial force between the transfer table and the tire pressing section, and the reactional force of the pressing section relative to the transfer table is detected with the load cell. By reading the pressure detected with the load cell, the RFV may be easily judged.

An arrangement is also proposed wherein the pressure detecting means comprises; a tire pressing section to which is attached a pressing member to be moved in the tire pressing direction with a transfer device, a press-in section which moves along the movement direction of the tire pressing section in the state of being capable of moving to and from the tire pressing section within a specified distance and is driven with a drive means to press the tire pressing section, and a load cell interposed between the tire pressing section and the press-in section; and the reactional force of the tire pressing section relative to the press-in section is detected with the load cell. Here, when the press-in section is transferred in the tire pressing direction with a drive means such as a servomotor or a servo-cylinder, the tire pressing section is pressed with the press-in section and the pressing member attached to the press-in section comes into pressing contact with the ground contact surface of the tire assembly. As the reactional force of the tire pressing section relative to the press-in section is detected with the load cell, the RFV can be easily judged by reading the detected value of the pressure.

With this constitution, it is arranged that a tire pressing section to which is attached a pressing member, and a press-in section are attached to a single sliding mechanism guided in the tire pressing direction and made to be slidable in the tire pressing direction in the state of being capable of moving to and from each other within a specified distance, and a load cell is interposed between the tire pressing section and the press-in section. With this constitution, since a single sliding mechanism guides and moves the tire pressing section and the press-in section, the constitution is simplified.

Here, it is possible to constitute with a means for storing a pressing pattern for the tire snug fitting process to perform the snug fitting process according to the stored pressing pattern. With this constitution, it is possible to bring about appropriate snug fit between wheel and tire quickly by giving varying loads to the tire assembly according to the pressing pattern stored in advance in the control device.

This pressing pattern may be made to correspond to varying loads occurring when an actual vehicle is run or to loads that vary like a sine curve. When the varying loads are exerted to the tire assembly according to the pressing pattern data, snug fit between wheel and tire is realized quickly according to the pressing pattern similar to that occurring during actual run of a vehicle.

Further, a tire assembly manufacturing method is proposed, which method employs the snug fitting process characterized by performing in succession a snug fitting process of pressing a pressing member against the ground contact surface of a tire assembly being rotated with a rotary drive device, and a tire assembly snug fit measurement process of pressing the same or another pressing member against the road contact surface of the tire assembly also being rotated and measuring with the pressure detecting means the variation in the reactional force of the tire. With this manufacturing method, since whether the snug fitting process is appropriately performed is constantly verified in the measurement process and so tire assemblies of stabilized characteristic can be provided. That is, as shown in FIG. 25, in the conventional process, a tire assembly is made in a series of steps; tire and wheel are fitted together, inflated with air, and subjected to a snug fitting process and to a balance correction process, and the snug fit is checked by sampling inspection. In the manufacturing method of this invention, as shown in FIG. 24, the measurement-judgment process can be made immediately after the snug fitting process, the snug fit state is assured for all the tire assemblies, and so the tire assemblies of good quality are provided through such a series of processes.

BRIEF DESCRIPTION OF THE DRAWINGS

Other objects, features and advantages of the present invention will become apparent from the detailed description of the preferred embodiments which follows, when considered in light of the accompanying drawings, n which.

DETAILED DESCRIPTION OF THE PREFERRED EMBODIMENTS OF THE INVENTION

Figure 1:
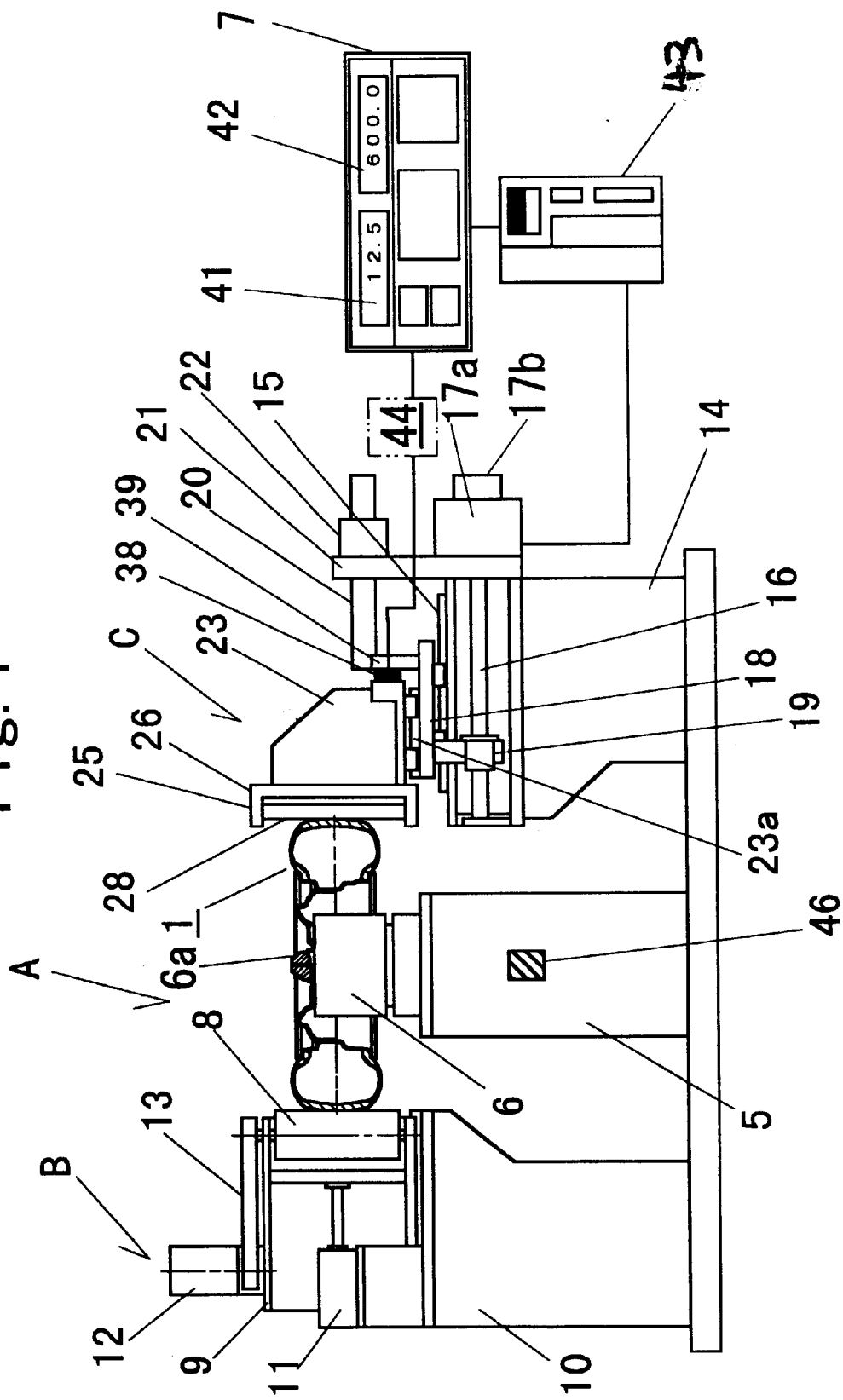
FIG. 1 is a general front view of a snug fitting apparatus provided with a snug fit measuring device C according to a first embodiment of the invention.
Figure 2:
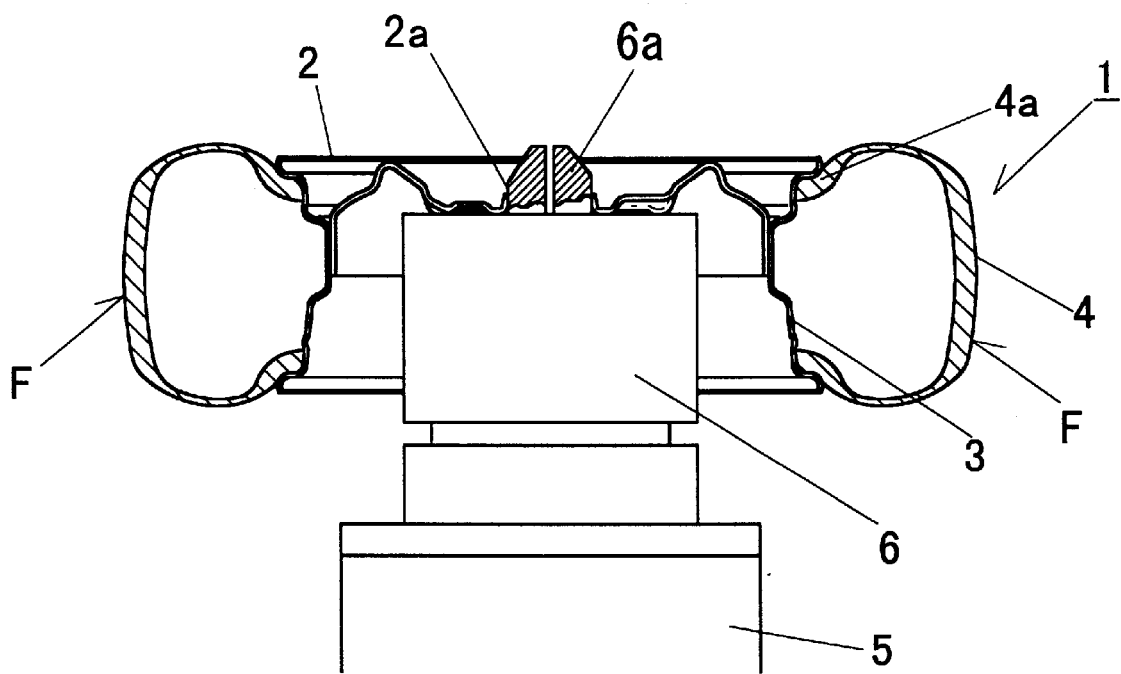
FIG. 2 is a sectional enlarged view of the state of holding a tire assembly 1.
Figure 3:
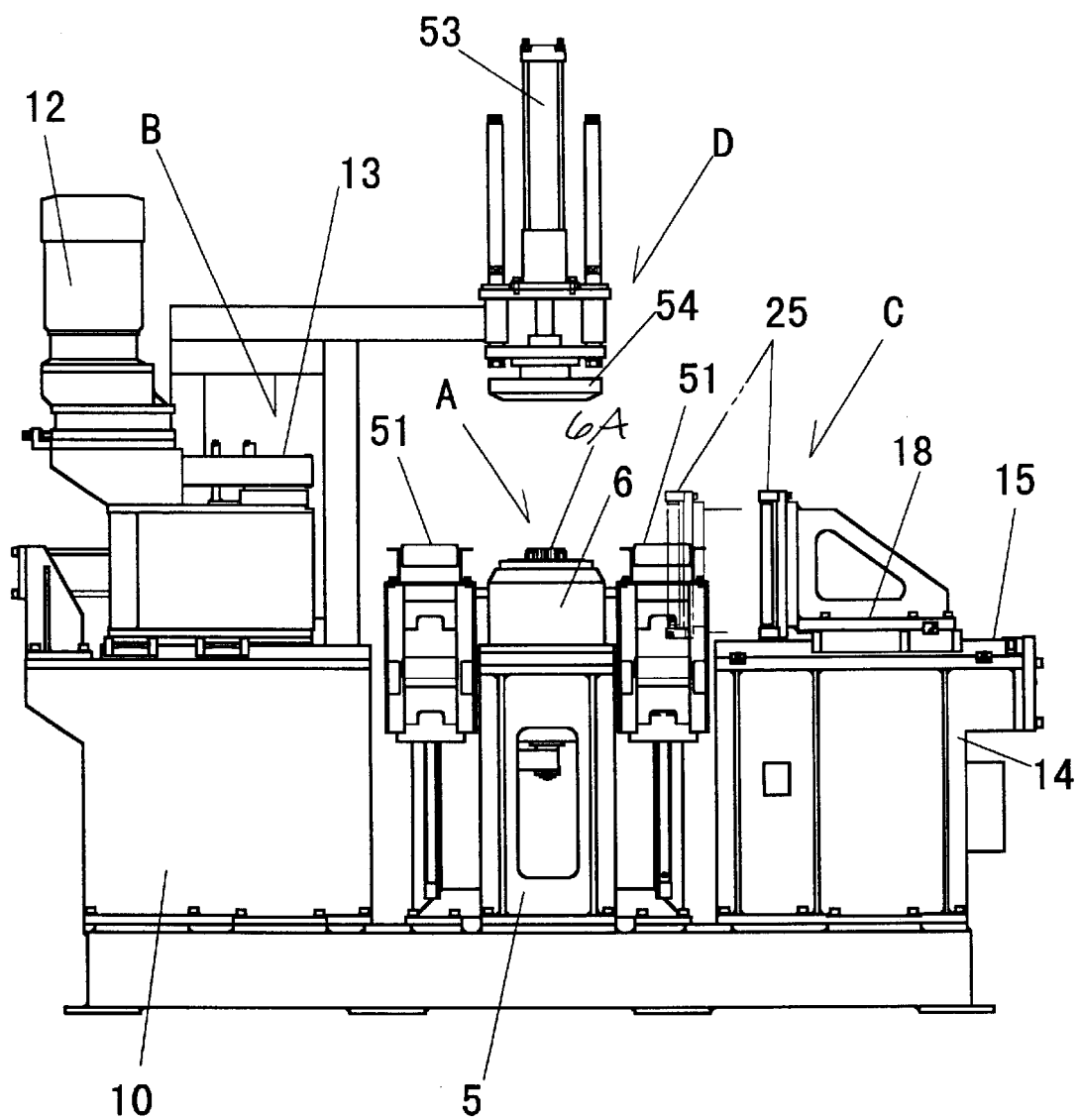
FIGS. 3 to 5 show a specific example of the apparatus of FIG. 1 in front, side, and plan views, respectively.
Figure 4:
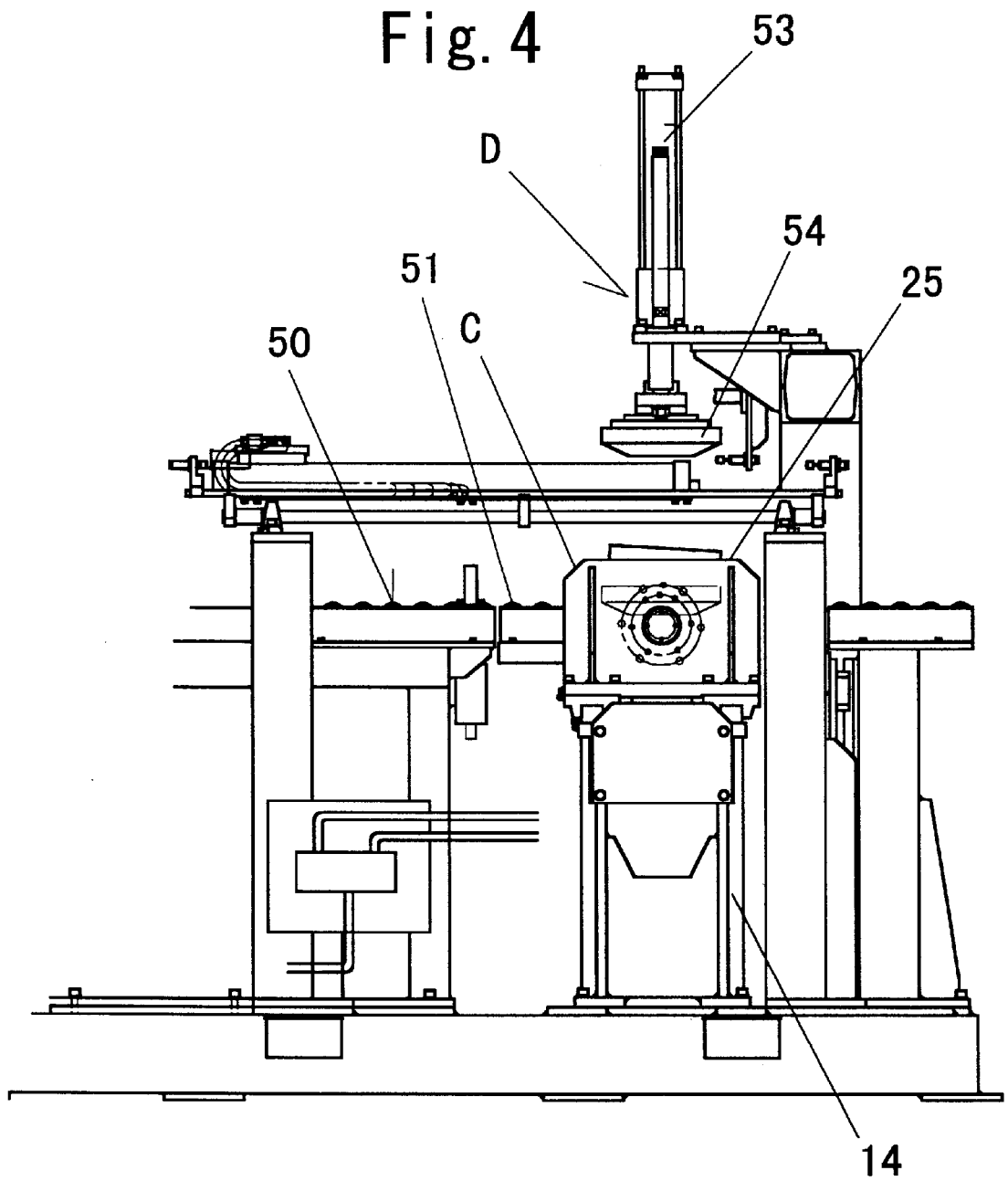
Figure 5:
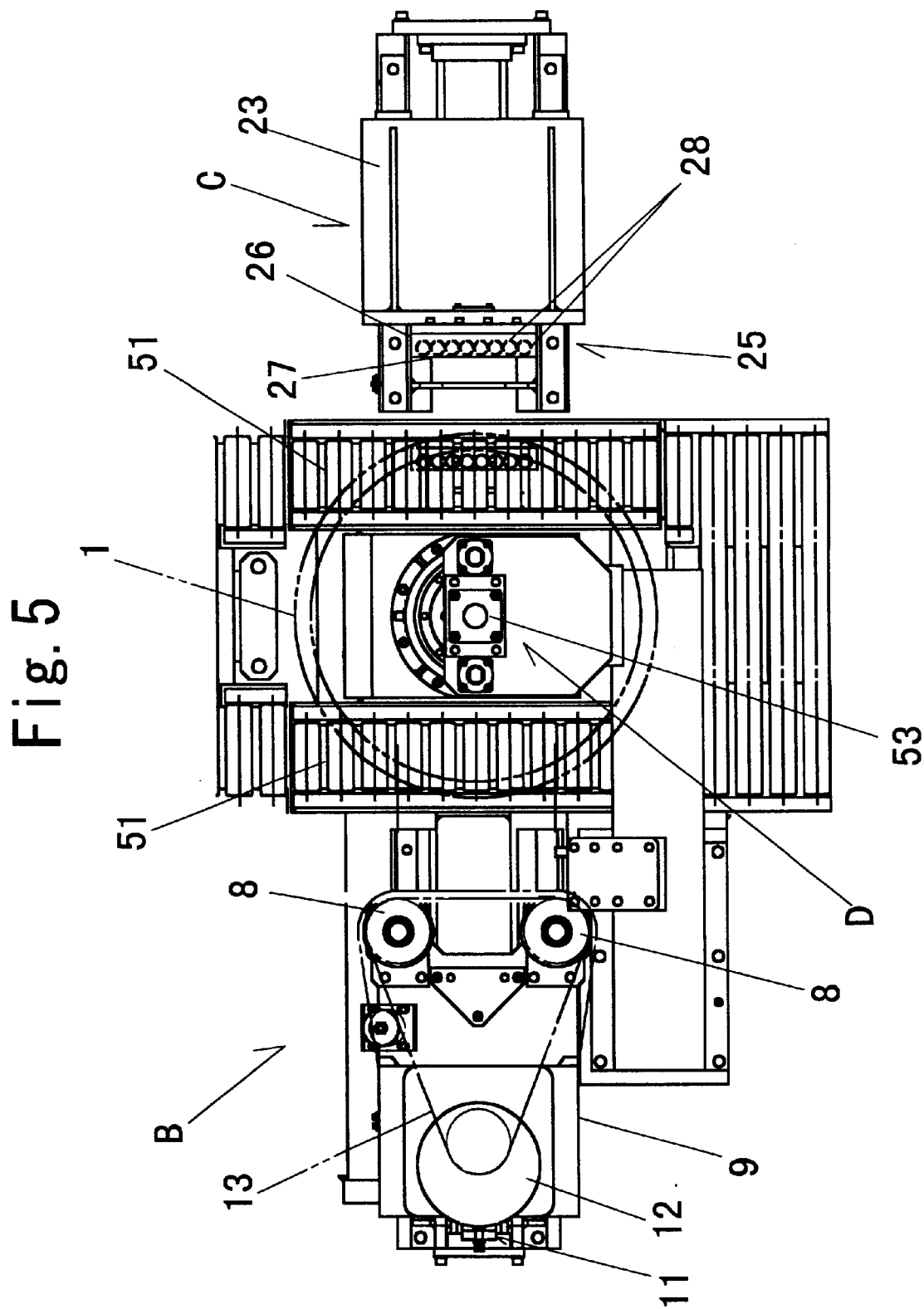

FIGS. 1 and 2 are general front view of a snug fit process apparatus as a first embodiment of the invention. FIGS. 3 to 5 show specific examples of the apparatus.

Here, a tire assembly 1 as shown in enlarged view in FIG. 2 is made by fitting the rim portion 4a of a tire 4 to the rim portion 3 of a disk wheel 2, and inflating the tire 4 with air to a specified pressure. The tire assembly 1 is subjected to the snug fitting process and the measurement process in succession by means of a snug fitting process apparatus. The snug fitting process apparatus is made up of; a work holding section A for rotatably holding the tire assembly 1, rotary drive devices B placed on one side of the work holding section A, and a snug fit measurement device C placed on the other side.

The work holding section A for the tire assembly 1 has a rotary type chuck 6 provided on the top of a receiving table 5. The opening 2a of the hub of the tire assembly 1 is fit over the claw 6a of the rotary type chuck 6 and is held and supported for free rotation of the tire assembly 1 with the claw 6a. The amount of rotation of the tire assembly 1 is detected with a rotary encoder 46. Above the work holding section A is disposed a pressing device D comprising a pressing member 54 freely rotatably supported on the cylinder rod of an air cylinder 53. The tire assembly 1 transported on a roller conveyor 50 from a previous process is placed on the work holding section A. When roller conveyors 51, 51 disposed for vertical movement on both sides of the work holding section A are lowered, the tire assembly 1 is centered with the rotary chuck 6. The air cylinder 53 is operated to press the tire assembly with the pressing member 54, and the tire assembly 1 is supported for free rotation. Incidentally, the pressing member 54 is not shown in FIG. 1.

The rotary drive device B for the tire assembly 1 is constituted that; an air cylinder 11 is mounted on the top of a fixing pedestal 10. A framework 9 is attached to the piston rod of the air cylinder 11, for back-and-forth movement relative to the axis of the work holding section A. Drive rollers 8, 8 are supported for rotation about vertical axes on the framework 9. A drive motor 12 is attached also to the framework 9. The drive shaft of the drive motor 12 is connected through a pulley belt 13 to the drive rollers 8, 8. As the drive rollers 8, 8 are driven with the drive motor 12 and the air cylinder 11 is driven in the extending direction, the drive rollers 8, 8 advance toward the center of the work holding section A, come into pressing contact with the ground contact surface F of the tire assembly 1, and exert their rotary drive forces to the tire assembly 1 to rotate it in a specified direction.

Next the constitution of the snug fit measurement device C will be described.

A slide rail 15 for the transfer table 18 to ride on and to be guided is formed, over a fixing table 14, parallel to the transfer direction of the drive roller 8. A servomotor 17a mounted on the fixing table 14 controls a feed screw shaft 16 extending parallel to the slide rail 15 to rotate in normal and reverse directions. A screw engagement part 19 suspended from the transfer table 18 is made to engage with the feed screw shaft 16. When the servomotor 17a is operated, the transfer table 18 is transferred back and forth along the slide rail 15 by the guiding action of the feed screw shaft 16.

A guide rod 20 is disposed parallel to the slide rail 15 on the transfer table 18. The guide rod 20 is passed through a lock device 22 supported on a fixing bracket 21 of the fixing table 14. The transfer table 18 is adapted to be locked at any intended position by the action of the lock device 22.

A tire pressing section 23 is placed on a slide rail 23a, made parallel to the slide rail 15 and disposed on the transfer table 18. A pressing member 25 is fixed to the tire pressing section 23. The pressing member 25 comprises a roller support piece 26 supporting plural freely rotatable pressing rollers 28 (shown in FIGS. 5 and 8) disposed parallel and close to each other to form a set 27 of the pressing rollers 28.

Figure 6:
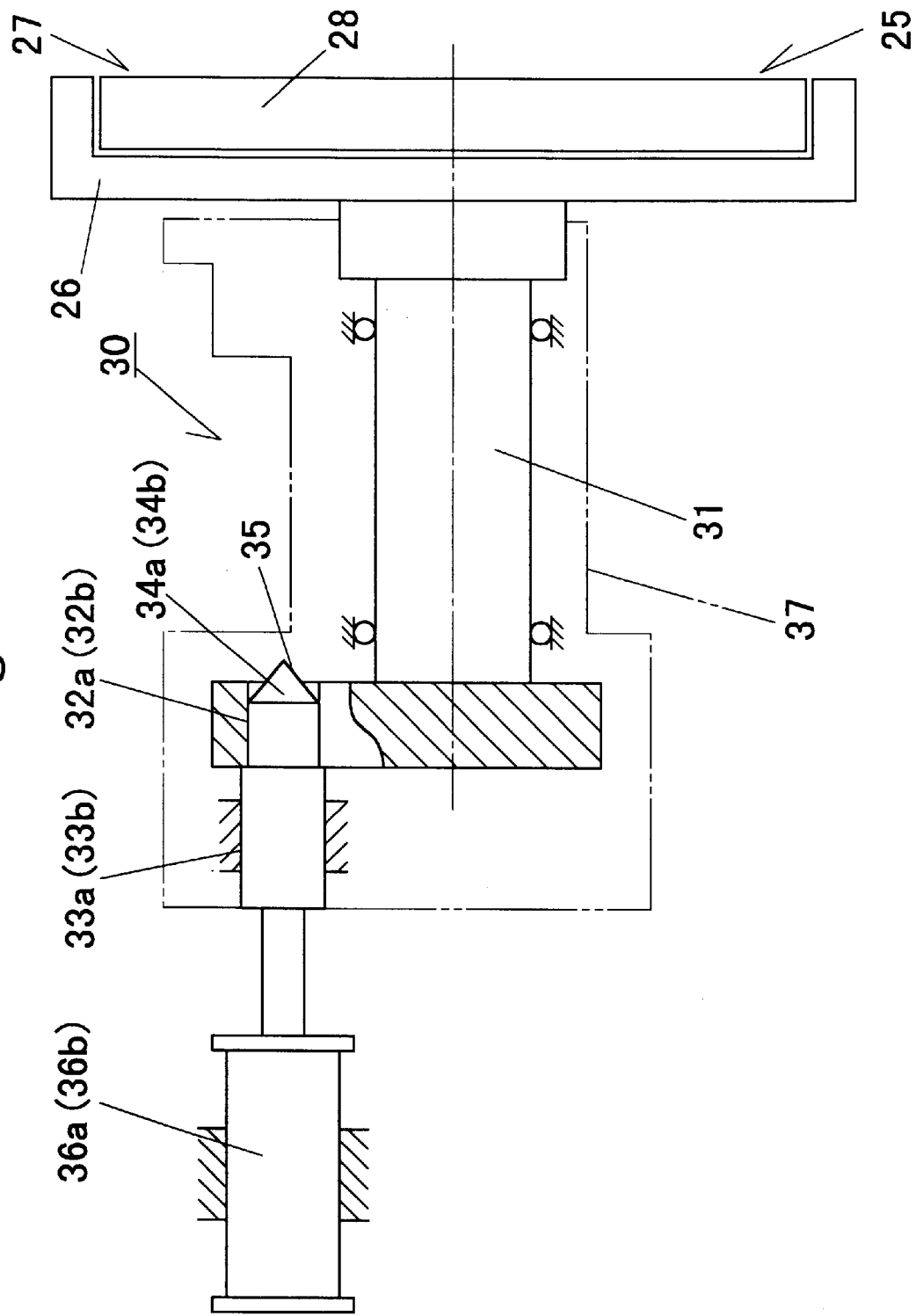
FIG. 6 is a general vertical sectional view of an angle setting mechanism.
Figure 7:
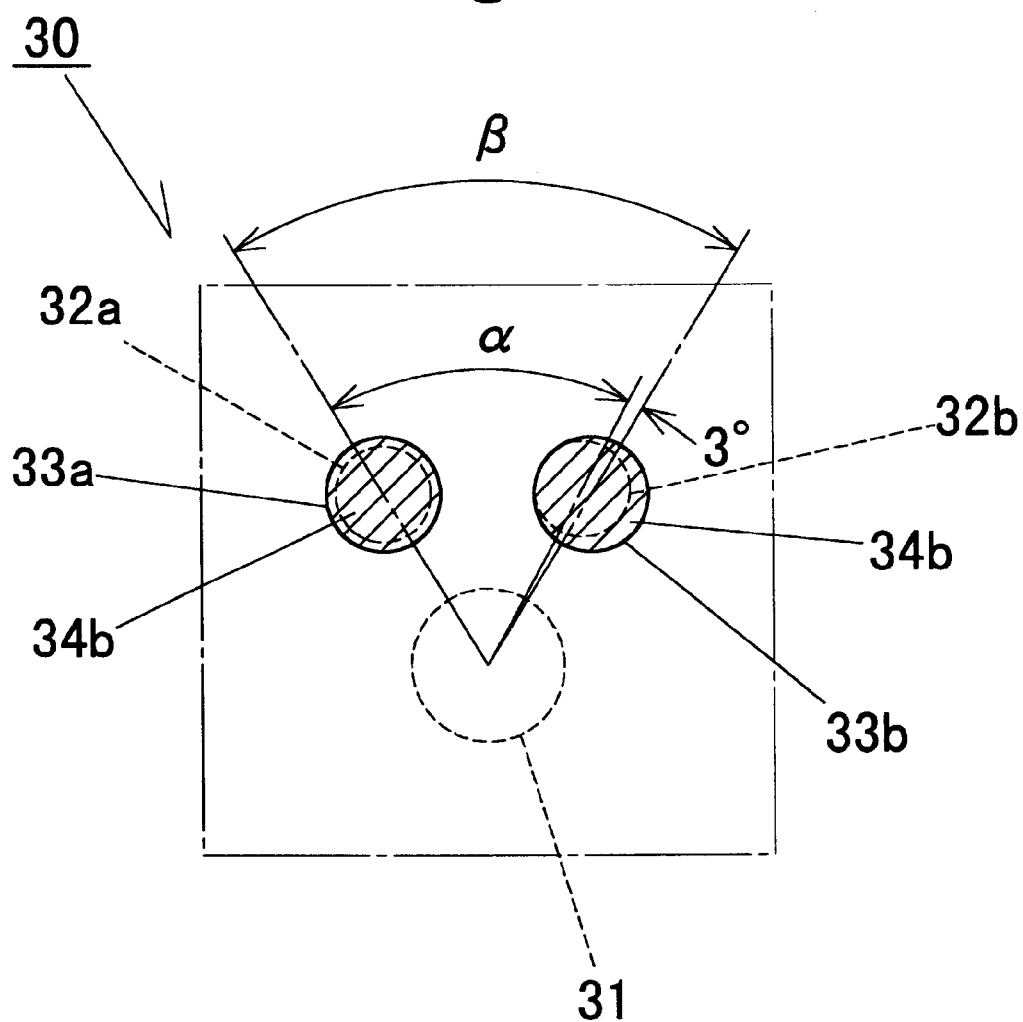
FIG. 7 is a general front view of the angle setting mechanism.

The pressing member 25 is adapted to be capable of setting the slip angle of the pressing rollers 28 to either 3 or 0 degrees with an angle setting (indexing) mechanism 30. FIGS. 6 and 7 show the angle setting mechanism constituted as follows: A rotary shaft 31 attached to the roller support piece 26 is rotatably supported with a bearing member 37 secured to the tire pressing section 23. The end part of the rotary shaft 31 is bored with selection holes 32a and 32b. The back side of the bearing member 37 are bored with pin holes 33a and 33b. The selection holes 32a, 32b and the pin holes 33a, 33b are located at an interval on the same circle. The sector angle α about the center of arc between the selection holes 32a and 32b is set smaller by 3 degrees than the sector angle β about the center of arc between the pin holes 33a and 33b. Therefore, the selection hole 32a and the pin hole 33a, axially opposing each other, can be axially aligned, and likewise the selection hole 32b and the pin hole 33b can be axially aligned. When one pair of selection hole and pin hole are aligned, the other pair of selection hole and pin hole are out of alignment each other by 3 degrees. The fore-ends of the pins 34a, 34b are formed with a conical guide portion 35, so that either pin can be inserted into corresponding selection hole and pin hole in spite of the presence of angular displacement from the hole axis by three degrees. When the pin 34a is inserted into the selection hole 32a and the pin hole 33a, or when the pin 34b is inserted into the selection hole 32b and the pin hole 33b, the guiding effect of the conical guide portion 35 causes the roller support piece 26 to rotate by 3 degrees either clockwise or counterclockwise. As a result, the selection hole 32a and the pin hole 33a, or the selection hole 32b and the pin hole 33b are aligned, and the roller support piece 26 is locked relative to the bearing member 37. In this way, the slip angle of the pressing roller 28 is switched between 0 degree and 3 degrees by the angle changing (indexing) movement.

In this way, the roller support piece 26 may be rotated either clock- or counterclockwise by the small angle of 3 degrees by choosing and inserting either pin 34a or 34b. Here, the selection of the small angle may also be made automatically. That is, lock cylinders 36a, 36b are provided in positions respectively corresponding to the position of the selection hole 32a and the pin hole 33a and the position of the selection hole 32b and the pin hole 33b, and the respective cylinder rod ends are provided with the pins 34a and 34b. It is arranged that when the lock cylinder 36a is driven to extend and the lock cylinder 36b is driven to retract, the slip angle becomes 0 degree, and that when the lock cylinder 36a is driven to retract and the lock cylinder 36b is driven to extend, the slip angle becomes 3 degrees. The selection is made, as will be described later, that the slip angle is set to 3 degrees in the snug fitting process to produce a component force in the direction of width relative to the ground contact surface F by the tilt of the pressing roller 28. In the measurement process, since the roller has only to be brought into contact with the ground contact surface F in the radial direction, the operating directions of the lock cylinders 36a, 36b are switched so that the slip angle becomes zero.

A press-in section 39 for securing a load cell 18 is provided to rise on the transfer table 18. The load cell 18 is held with a radial force between the press-in section 39 and the back side of the tire pressing section 23. When the pressing member 25 is in contact with the ground contact surface F of the tire assembly 1, since the transfer table 18 is in the fixed state, the reactional force of the pressing member 25 is applied to the load cell 38.

The reactional force applied to the load cell 38 is read from display sections 41, 42 provided in a control-measurement-judgment section 7. That is, the control console having the built-in control-measurement-judgment section 7 has the display sections 41, 42. The right hand side display section 41 indicates the overall reactional force produced as the pressing member 25 is pressed against the ground contact surface. The left hand side display section 42 indicates variation in the reactional force measured over one turn of the tire assembly 1.

Figure 9:
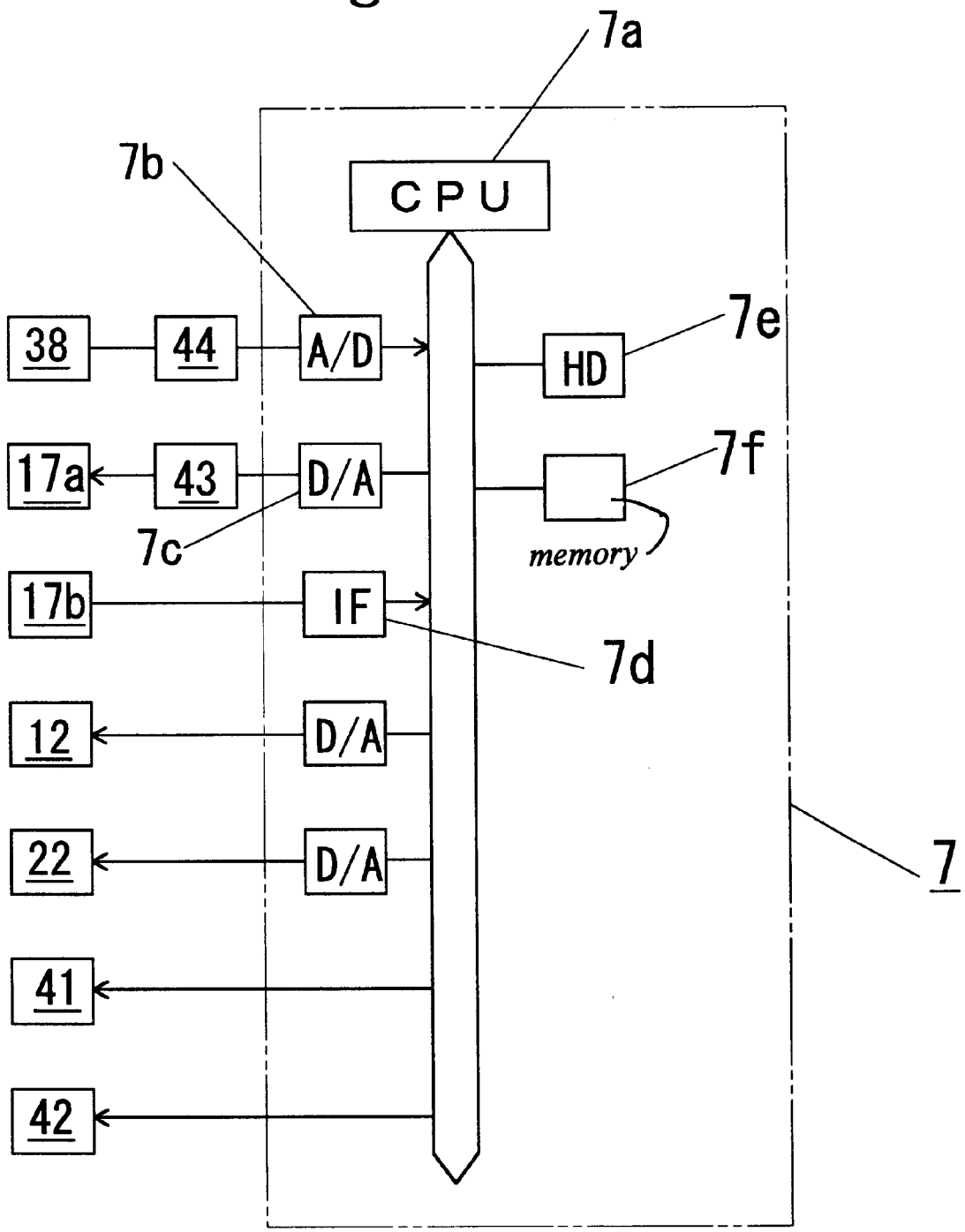
FIG. 9 is a block diagram of a control means.

The servomotor 17a is controlled to rotate at a rotary speed in proportion to voltage signals given to a motor drive amplifier 43. The voltage signal to the motor drive amplifier 43 is sent, as shown in FIG. 9, from a DA converter 7c which is a component of the control-measurement-judgment section 7. The signal of the force acting on the ground contact surface of the tire assembly 1 and detected with the load cell 38 is amplified with a load cell amplifier 44 and taken in through an AD convertor 7b.

The variation in the distance between the rotation center of the tire assembly 1 and the pressing roller can be measured as the rotation amount of the servomotor 17a. The rotation amount is measured with an encoder 17b attached coaxially to the servomotor 17a, and taken through an interface 7d for the encoder into the control-measurement-judgment section 7. A CPU 7a controls the whole control-measurement-judgment section 7 using a hard disk 7e, a memory 7f, etc. The control-measurement-judgment section 7 constitutes the process control means of this invention to perform the following process.

Figure 10:
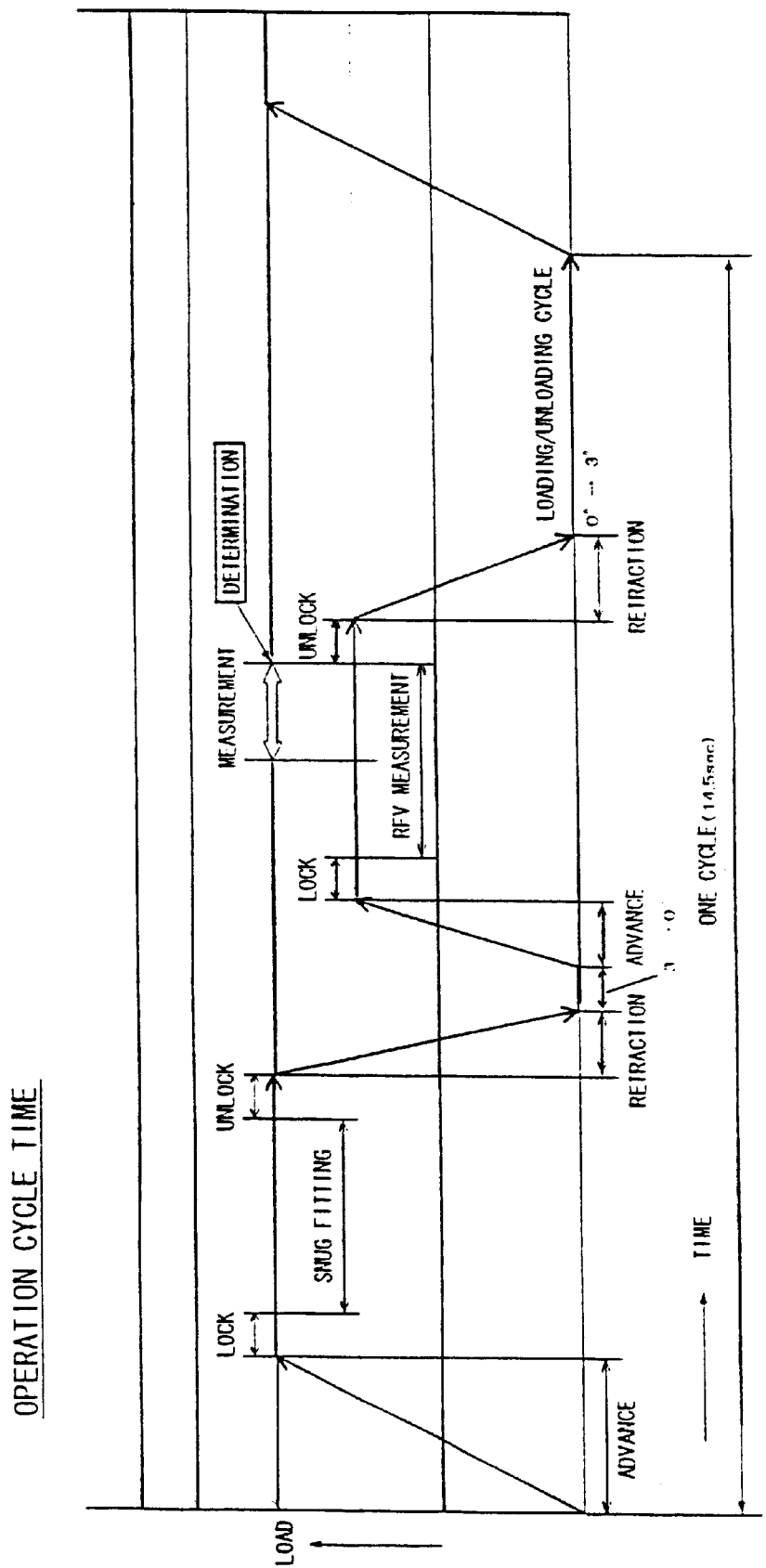
FIG. 10 is an operation cycle time diagram of the snug fitting apparatus of the present invention.
Figure 11:
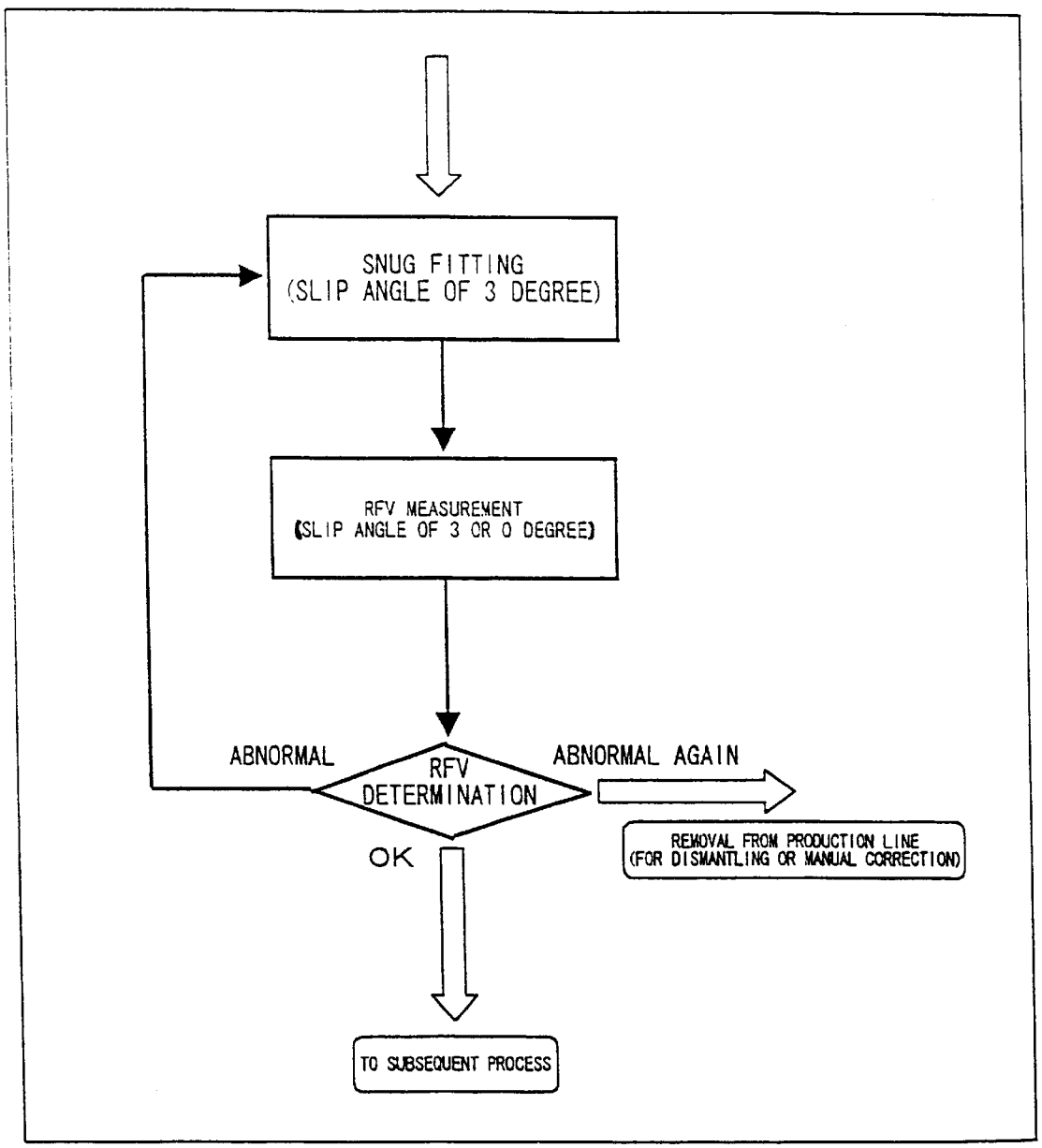
FIG. 11 is a flowchart of the operation of the snug fitting apparatus of the present invention.

The above devices are disposed in the flow of production line for the tire assembly 1. The tire assembly 1 is automatically attached to the work holding section A. The operation of the automatic tire assembly attachment will be hereinafter described in reference to FIG. 10 showing an operation cycle time and FIG. 11 showing a flowchart.

Snug Fitting Process:

As described before, the tire assembly 1 transported on the roller conveyor 50 from the previous process is placed on the work holding section A, the roller conveyors 51, 51 disposed for vertical movement on both sides of the work holding section A are lowered, the opening portion 2a of the hub is fit from above to the claw 6a of the rotary type chuck 6 of the work holding section A, the air cylinder 53 is operated to press from above the tire assembly 1 with the pressing member 54 fixed to the rod of the air cylinder 53, and the tire assembly 1 is supported in a stabilized state. In this supported state, the tire assembly 1 is freely rotatable.

In the rotary drive device B, a drive motor 12 is operated, the piston rod of the air cylinder 11 is extended, and drive rollers 8, 8 are pressed against the ground contact surface F of the tire assembly 1 to impart driving force. As a result, the tire assembly 1 rotates about the axis of the work holding section A. The amount of rotation is detected with the encoder 46.

In the state of the tire assembly 1 being rotated, the servomotor 17a of the snug fit measurement device C is operated to advance the transfer table 18 by the feeding action of the feed screw shaft 16 and to press the pressing member 25 mounted on the tire pressing section 23 against the ground contact surface F of the tire assembly 1. The pressing member 25 is held in the slip angle position of 3 degrees with the angle setting mechanism 30. At the time point when the reactional force due to the pressing contact detected with the load cell 38 and displayed on the display section 42 reaches a preset value, the CPU controls the servomotor 17a to stop driving, and the lock device 22 sets the transfer table 18 to an immovable, locked position.

The tire assembly 1 in the state of the ground contact surface F being pressed with the pressing member 25 makes several turns, receives a lateral force due to the slip angle. As a result, the fit between the rim portion 3 of the disk wheel 2 and the rim portion 4a of the tire 4 becomes tight and favorable. That is to say, since the pressing rollers 28 have a slip angle α, a lateral force is produced with the friction between the drive roller 8 and the ground contact surface F of the tire 4. At the same time, the pressing rollers 28 provide a wide pressing area that is similar to the road surface on which actual vehicles run, so that a similar load to that with the actual vehicle acts on the ground contact surface F of the tire assembly 1. Furthermore, since gaps are present among the pressing rollers 28, the pressing surface becomes irregular to some extent and is very similar to the irregular road surface. As a result, the lateral force acts on the tire 4 while similar loads occurring when the actual vehicle runs act on the tire assembly. If any incomplete fit exists between the bead portion of the tire 4 and the bead portion of the rim 3, such a fit is corrected as the former is pressed against the latter through the side wall portion of the wobbling tire 4, and a stabilized fit state is realized that is maintained even in the actual vehicle drive.

Measurement Process:

Then, the pressing member 25 stops rotating, the lock device 22 unlocks, the servomotor 17a is driven in the reverse direction to retract the transfer table 18 on the slide rail 15. When the reactional force received on the pressing member 25 becomes 0 kgN, the servomotor 17a stops driving, the angle setting device 30 is driven to set the pressing rollers 28 of the pressing member 25 to vertical position, so that the slip angle is set to 0 degree, and the servomotor 17a is driven again in the normal direction. Then, the transfer table 18 is moved to press the pressing rollers 28 of the pressing member 25 against the tire assembly 1 until a preset reactional force value is detected with the load cell 38. Here, the servomotor 17a is stopped and locked to make the transfer table 18 immovable. Then the tire assembly 1 is rotated through one turn by operating the rotary drive device B, the lock is unlocked, the servomotor 17a is driven in the reverse direction, and the transfer table 18 is retracted to a position where the reactional force becomes 0 kgN.

During the rotation, since the ground contact surface F does not necessarily remain in the same, truly cylindrical shape relative to the center of the tire assembly 1, the reactional force to the pressing rollers 28 varies. Since the tire pressing section 23 supporting the pressing member 25 is movable relative to the transfer table 18, the variation in the reactional force is detected with the load cell 38, and the variation value, namely the difference between the maximum and minimum values for one turn, is displayed on the display section 41. When the variation value is not less than a threshold value, it is determined that the snug fitting process is incomplete, or that the tire or wheel is abnormal. As described above, this constitution is arranged that the pressing member 25 is pressed and held until a preset reactional force value is detected, the servomotor 17a is stopped when the value is detected, the transfer table 18 is made immovable with the lock device 22, and the tire assembly 1 is rotated to detect variation in the reactional force with the load cell (pressure detecting means) 38.

Here, when the RFV is judged to be unacceptable, as shown in FIG. 11, the pressing member 25 is tilted again by 3 degrees to set the slip angle of the pressing rollers to 3 degrees, the servomotor 17a is driven again in the normal direction, and the same snug fitting process is repeated to correct the anomaly, and the measurement process is repeated. If the result is determined again abnormal with the variation value being not less than the preset threshold value, the tire assembly 1 is deemed to be a reject and removed from the production line, and subjected to disassembly or manual correction.

Of the above processes, the measurement process is one of the processes performed with the snug fitting apparatus and applied to all the tire assemblies 1 on the line. Unlike in the conventional arrangement, since the process is not performed by sampling, reliability is improved. Therefore, when the reactional force value is not less than the threshold value, the snug fitting process is applied again to the tire assembly. When the results is not below the threshold value again, the tire assembly 1 is determined to be unacceptable not only because of the poor fitting problem but possible problems in the tire and wheel, and is subjected to processes such as disassembly or manual correction according to the state of each product.

In the above process as shown in FIG. 10, the snug fitting process takes 5.75 seconds, the measurement process takes 5.25 seconds, and the entire process including the time for conveying in and out the tire assembly 1 takes 14.5 seconds (time values are mere design examples) according to a design setting on condition that no poor fitting problem occurs. This means that the measurement of the snug fitting process can be performed within a very short period of time in full automation using the process control means.

Figure 8:
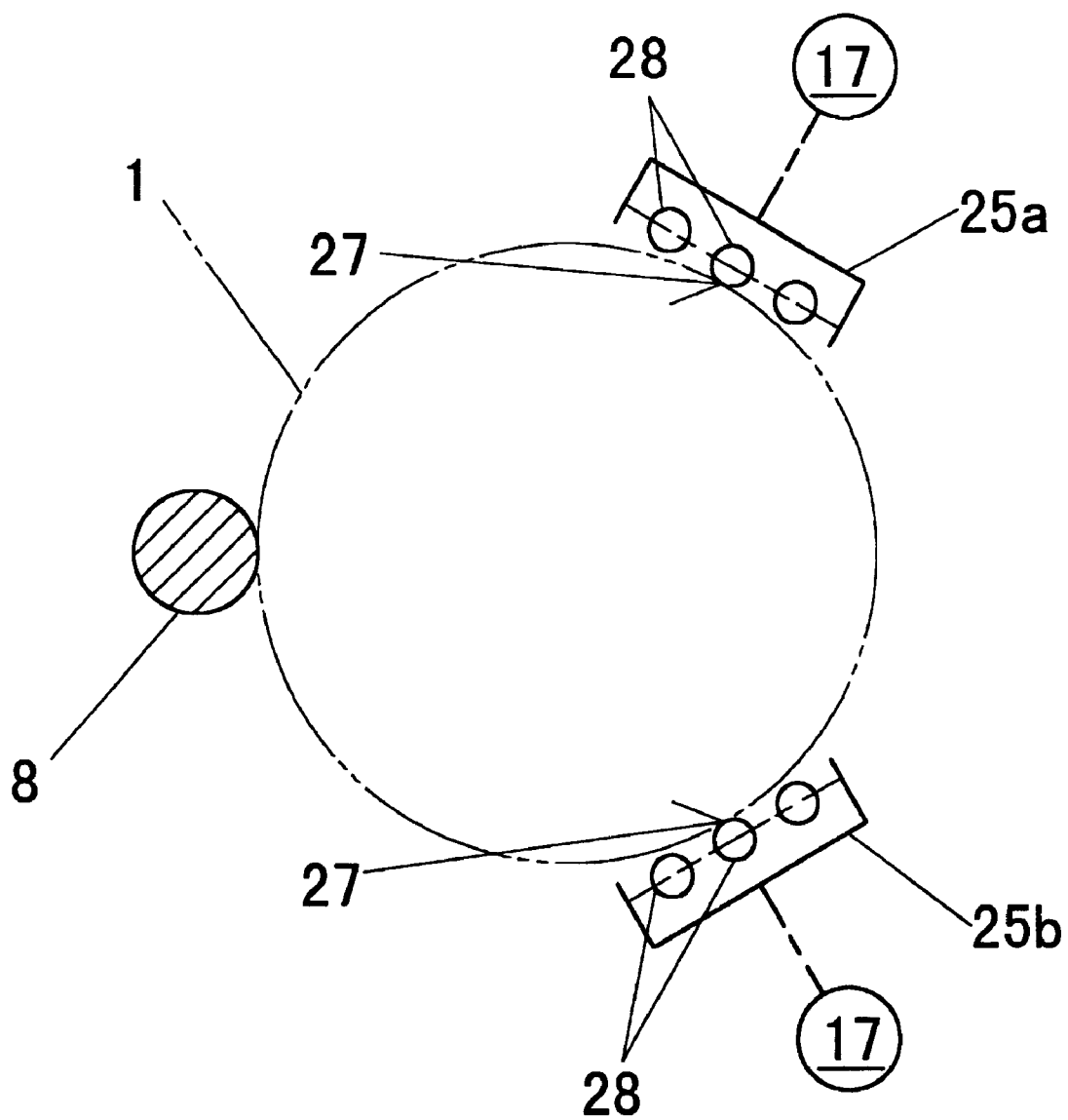
FIG. 8 is a general plan view of an arrangement provided with pressing members 25a and 25b.

In the above constitution for performing the snug fitting process and the measurement process, the single pressing member 25 is used. However, as shown in FIG. 8, it is also possible to use the first and second pressing members 25a and 25b, the former for the snug fitting process and the latter for the measurement process. In that case, slip angles may be preset according to the functions of the processes, for example about 3 degrees for the pressing rollers 28 of the pressing member 25a and 0 degree (without the lateral load) for the pressing rollers 28 of the pressing member 25b. This makes the angle setting mechanism 30 unnecessary. In other words, the previous embodiment can be seen that the single pressing member 25 serves both as the pressing members 25a and 25b.

The slip angle of 3 degrees in the above embodiments is a mere example to produce the lateral force, and so various angles may be set. The slip angle when the measurement is made is not limited to 0 degree but the same angle as that for the snug fitting process may be used. In that case, the angle changing action with the angle setting mechanism 30 may be omitted while using the single pressing member 25. In this way, the cycle time may be shortened.

Figure 12:
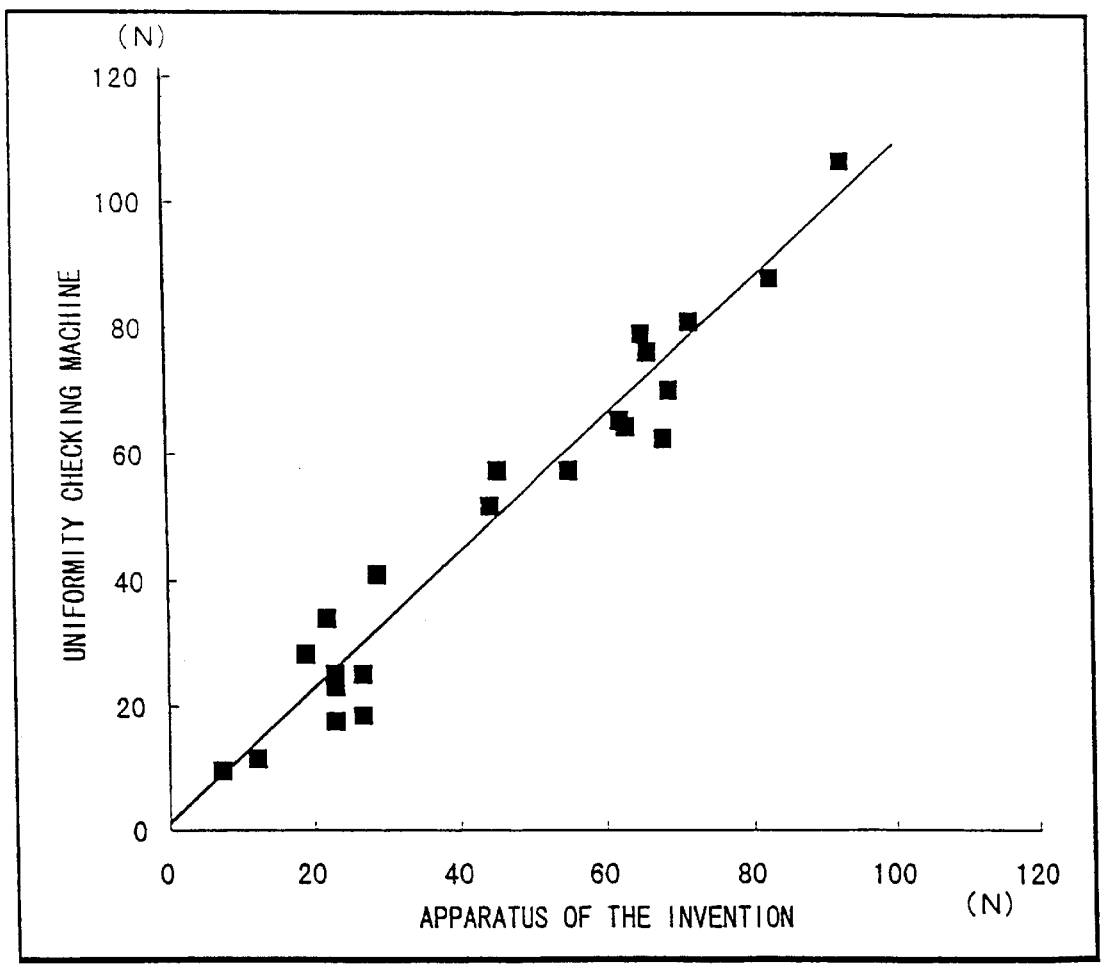
FIG. 12 is a graph of correlation for the same tire assembly between the data (lateral axis) measured in the measurement process of this invention and the first-order component (vertical axis) of the data measured with a conventional uniformity checking machine.

FIG. 12 is a graph of correlation for the same tire assembly 1 between the RFV data (lateral axis) measured in the measurement process of this invention and the RFV data (vertical axis) measured with a conventional uniformity checking machine. As a result, it has proved that the data measured in the measurement process of this invention and the data measured with the conventional uniformity checking machine are nearly in agreement. That is to say, it can be said that this invention is satisfactory to acquire measurement results for evaluating the RFV that greatly affects ride comfort and maneuverability.

Another Embodiment of the Snug Fit Measurement Device C'

Next, a snug fit measurement device C' as a second embodiment is described in reference to FIGS. 20 to 23. Here, components that are the same as those in the snug fit measurement device C are provided with the same symbols and their explanations are simplified.

In this constitution, a slide rail (slide mechanism) 15 on which a transfer table 18' is placed is arranged parallel to the movement direction of the drive rollers 8 over a fixed pedestal 14. The fixed pedestal 14 is provided with a servomotor 17a to control a feed screw shaft 16 extending parallel to the slide rail 15 to be capable of reverse rotation. A screw engagement section 19 suspended from the transfer table 18' is made to screw-engage with the feed screw shaft 16. When the servomotor 17a is drive in this arrangement, the transfer table 18' can be moved back and forth along the slide rail 15 by the guiding function of the feed screw shaft 16.

A tire pressing section 23' is placed also on the slide rail 15. The pressing member 25 is secured to the tire pressing section 23'.

Figure 23:
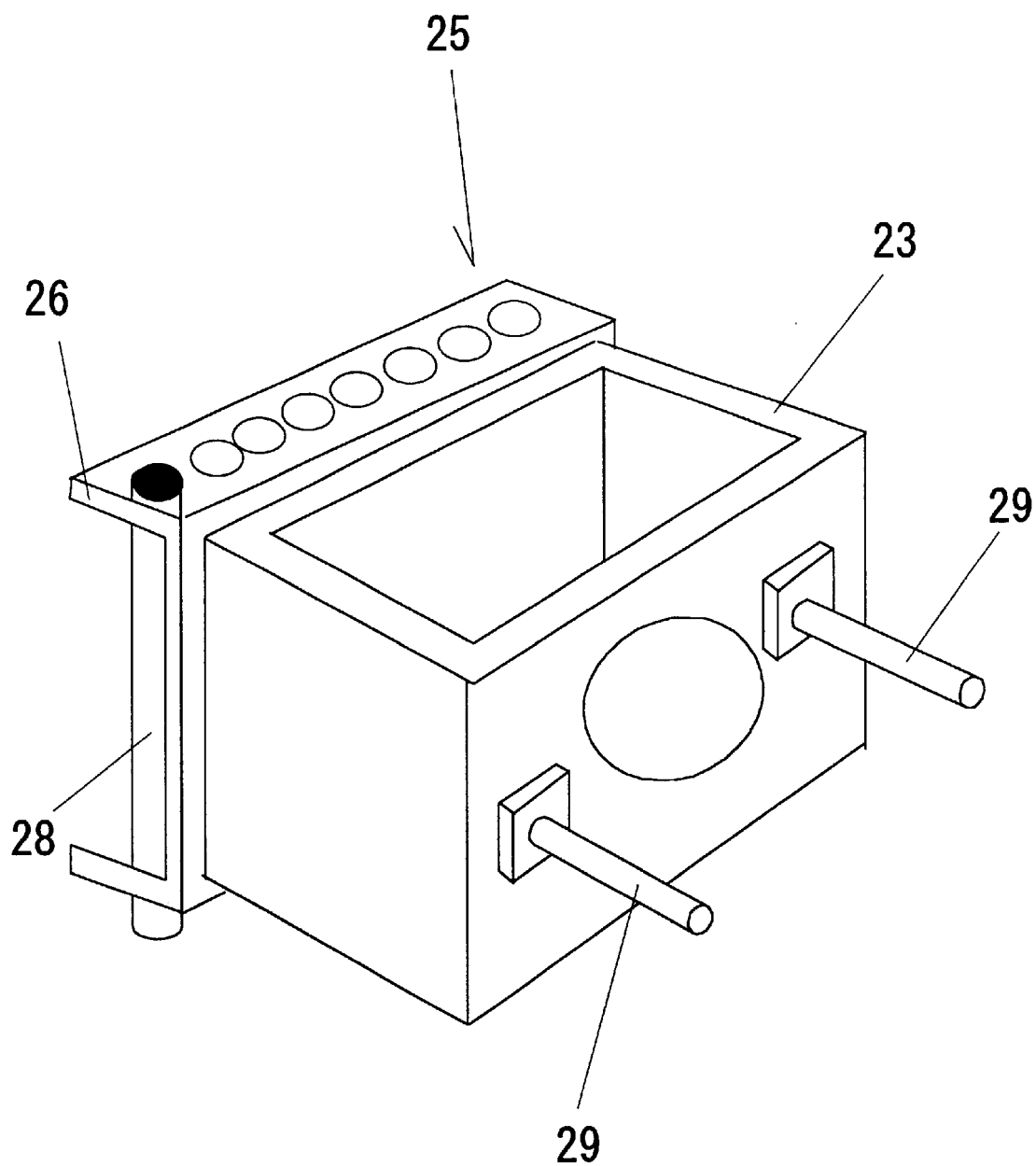
FIG. 23 is an oblique view of the tire pressing section 23' of the second embodiment.

On the other hand, a press-in section 39' for securing the load cell 38 is formed to project from the transfer table 18' so that the load cell 38 is held with a radial force between the press-in section 39' and the back side of the tire pressing section 23'. When the pressing member 25 is in contact with the ground contact surface F of the tire assembly 1, the transfer table 18' is in the fixed state and so the reactional force of the pressing member 25 is applied to the load cell 38. As shown in FIG. 23, two slide pins 29 are provided to project parallel with the slide rail 15 from right and left sides of the back side of the tire pressing section 23' to penetrate the press-in section 39. The penetrating ends of the slide pins 29 are provided with retaining washers 29a to restrict the back-and-forth movement of the press-in section 39 relative to the tire pressing section 23', between a pressed-in state in which the load cell 38 is squeeze-held and a retracted state in which a gap is produced between the load cell 38 and the tire pressing section 23'.

The control of the above constitution is the same as that of the previous embodiment, which is briefly described below.

Figure 21:
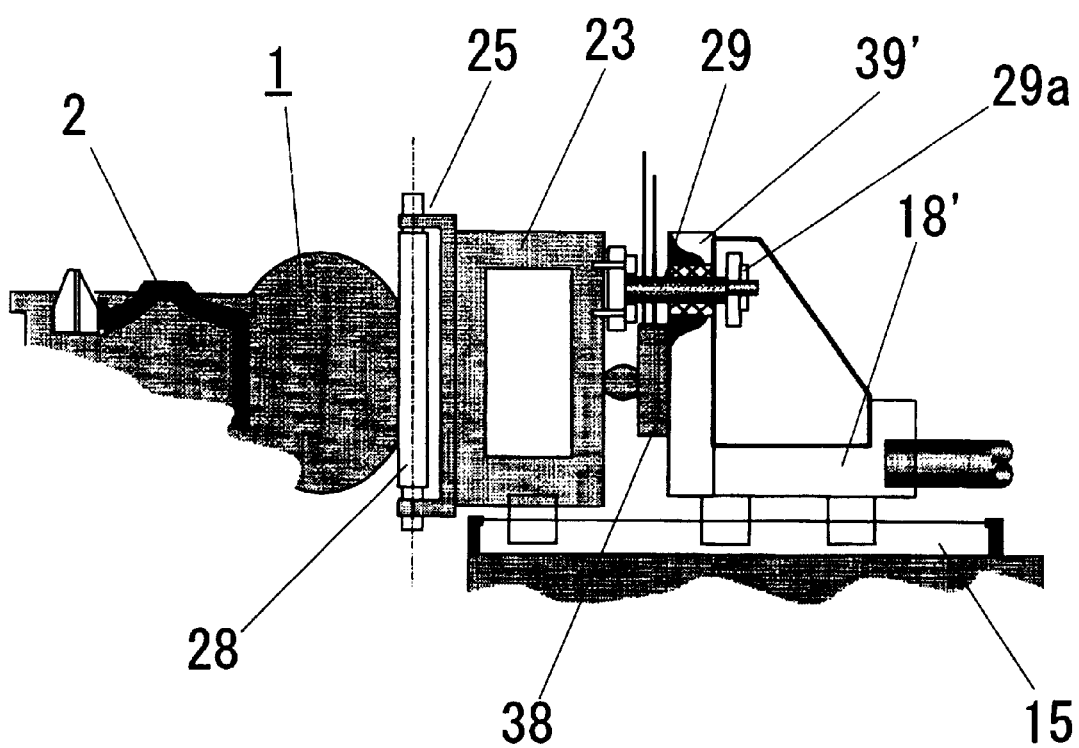
FIG. 21 is a side view of the snug fit measuring device C' with its load cell 38 loaded.
Figure 22:
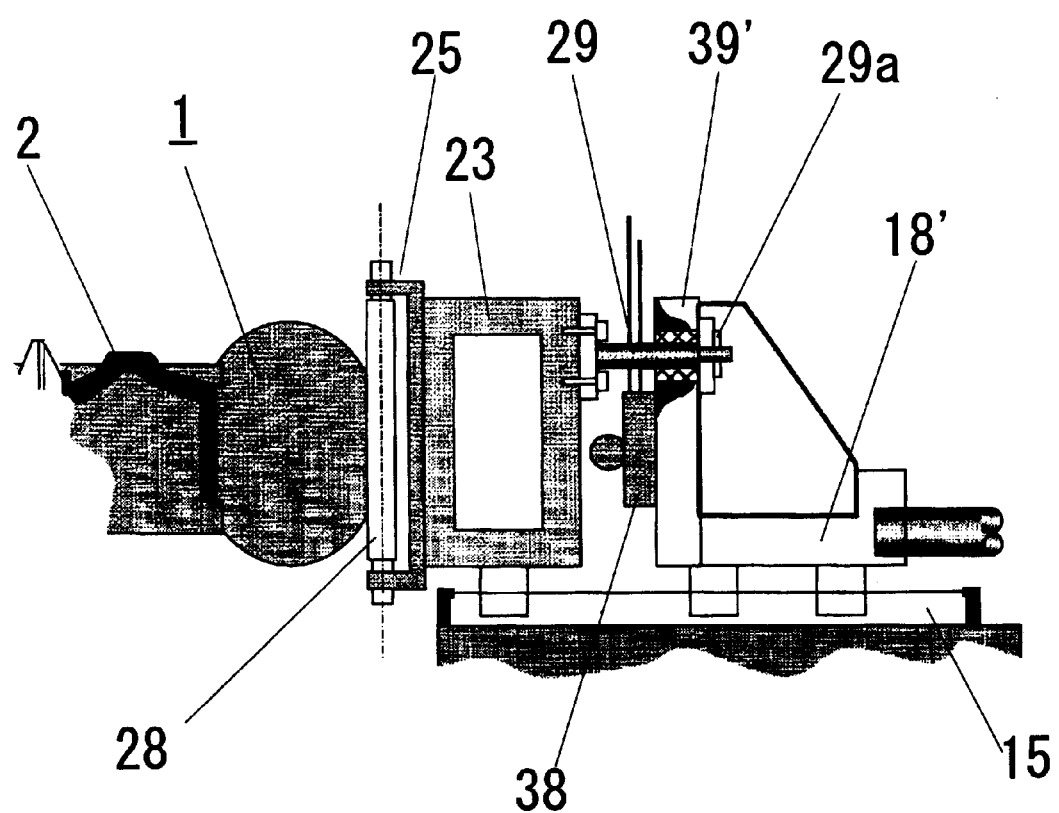
FIG. 22 is a side view of the snug fit measuring device C' with its load cell 38 not yet loaded.

In the state of the tire assembly 1 being rotated, the servomotor 17a of the snug fit measurement device C' is operated to advance the transfer table 18' by the feeding action of the feed screw shaft 16, as shown in FIG. 21, to press the tire pressing section 23' with the press-in section 39' of the transfer table 18' through the load cell 38, and to press the pressing member 25 of the tire pressing section 23' against the ground contact surface F of the tire assembly 1. In this way, the ground contact surface F of the tire is pressed. The reactional force of the pressing force applied as described above is detected with the load cell 38 and the same snug fit process control as that in the previous embodiment is performed. Thereafter, also as described above, measurement and judgment are performed. When the snug fit process and the measurement process are over, the servomotor 17a is driven reverse to retract the transfer table 18' by the feeding action of the feed screw shaft 16. As shown in FIG. 22, the transfer table 18' is moved away from the tire pressing section 23' until the press-in section 39' contacts the retaining washers 29a to produce a gap between the load cell 38 and the tire pressing section 23'. As a result, the load cell 38 is relieved of load. When the transfer table 18' is retracted farther, the tire pressing section 23' is pulled through the slide pins 29 with the transfer table 18'. Thus, as shown in FIG. 22, the pressing member 25 is separated from the ground contact surface F of the tire assembly 1.

In contrast to the snug fit measurement device C of the previous embodiment, this constitution is simpler because the transfer table 18' provided with the tire pressing section 23' and the press-in section 39' is placed on a common slide rail (slide mechanism) 15 and so the slide rail 23a on the transfer table 18 is made unnecessary. That is, the constitution is simplified.

Another Embodiment of RFV Judgment Control

With the above-described constitution, the pressing member 25 is pressed and held in contact until a preset reactional force value is detected, the servomotor 17 is stopped when the value is detected, the transfer table 18 is made immovable with the lock device 22, and the variation in the reactional force is detected with the pressure detecting means. On the basis of the above, a constitution is proposed to perform the RFV judgment using the displacement of the tire pressing section 23 (23') when the pressing force of the tire pressing section 23 (23') on the ground contact surface F of the tire assembly 1 is made constant. Here, the pressure detecting means for measuring the pressing force applied in the radial direction of the tire is constituted with the load cell 38, the load cell amplifier 44, and the control-measurement-judgment section 7. The displacement detecting means for measuring the displacement of the tire pressing section is constituted with the servomotor 17a, the encoder 17b, and the control-measurement-judgment section 7.

Figure 13:
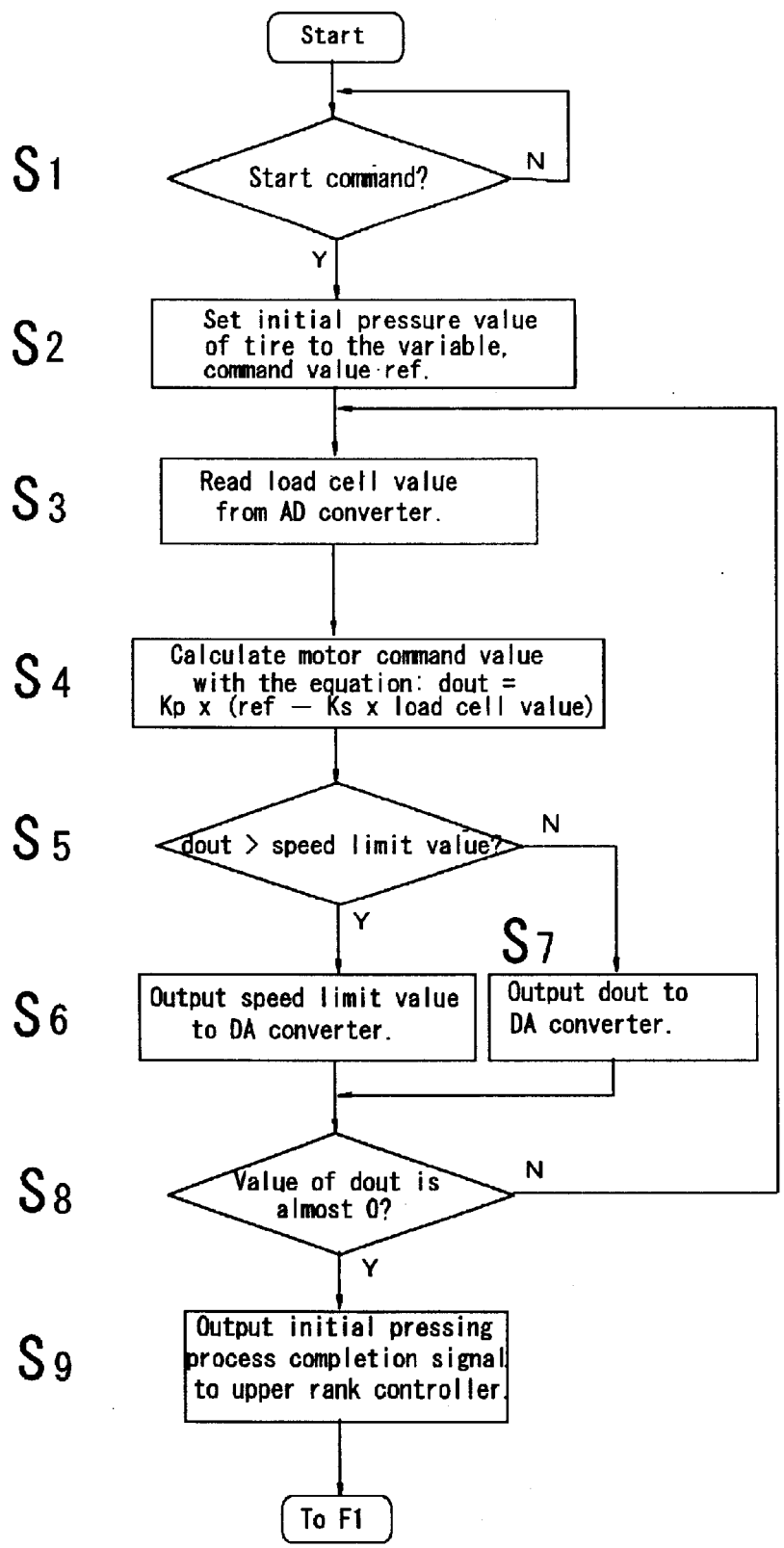
FIG. 13 is a flowchart of controlling the pressure on the tire assembly 1.

Control of the servomotor 17a to apply a specified pressure on the tire assembly 1 with the pressing rollers 28 is explained below using a flowchart shown in FIG. 13.

In the step S1, the control-measurement-judgment section 7 waits for a start command. Upon receiving a start command, in the step S2, the CPU 7a sets a variable, or a command value (ref), to an initial pressure value. In the step S3, the value of the load cell 38 is read from the AD converter 7b. In the step S4, a command value (dout) to be given to the servomotor 17a is calculated with the following equation.

$$dout = Kp \times (ref - Ks \times load\ cell\ value),$$

where Kp is a proportional gain, Ks is a sensor gain of the load cell amplifier 44.

If the "dout" calculated with the above equation is greater than a preset speed limit value, a specified speed limit value is outputted to the DA converter 7c in the step S6; otherwise, the "dout" value is outputted in the step S7. If the "dout" value is not yet zero (in the state of a specified pressure not being applied to the tire) in the step S8, the process goes back to the step S3 of reading the load cell value from the AD converter 7b. In case the "dout" value is almost zero in the step S9, it is judged that the tire is pressed up to the specified pressure, and a signal of completion of the initial pressing process is sent to an upper rank controller (not shown).

Figure 15:
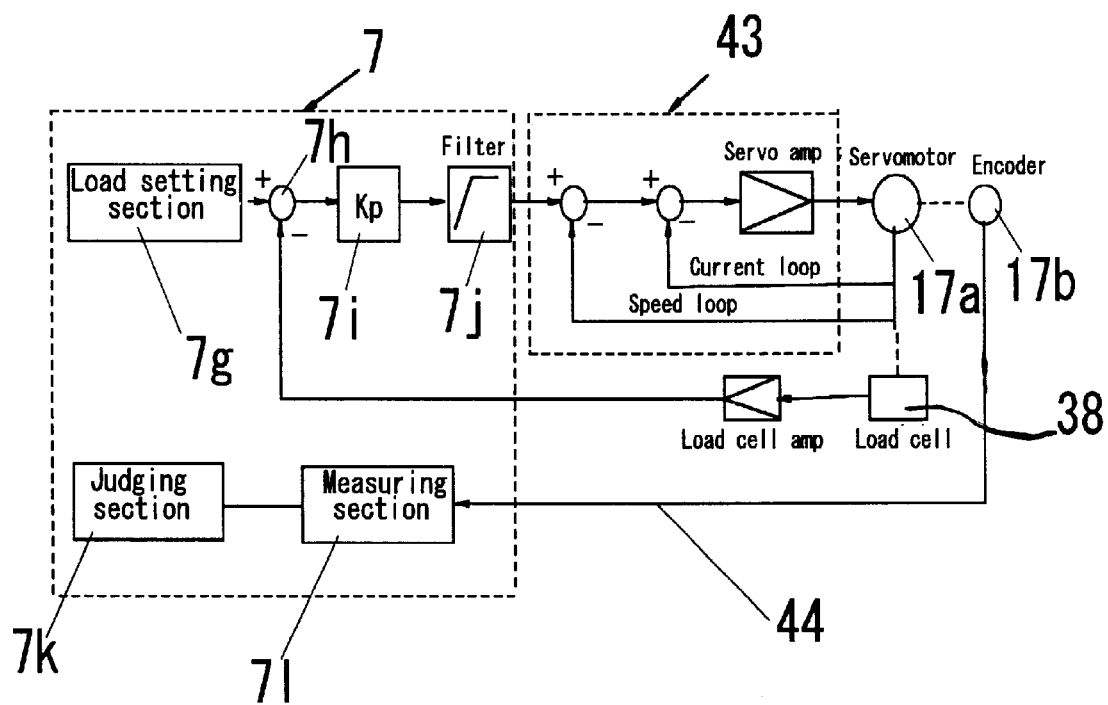
FIG. 15 is a block diagram of a control system for performing snug fitting process and measurement process.

FIG. 15 is a block diagram showing the above-described control. It constitutes a feedback control for the "ref" value to be set to a load setting section 7g. The control is accomplished by giving to the servomotor 17a a speed command in proportion to the deviation from a target load.

Figure 14:
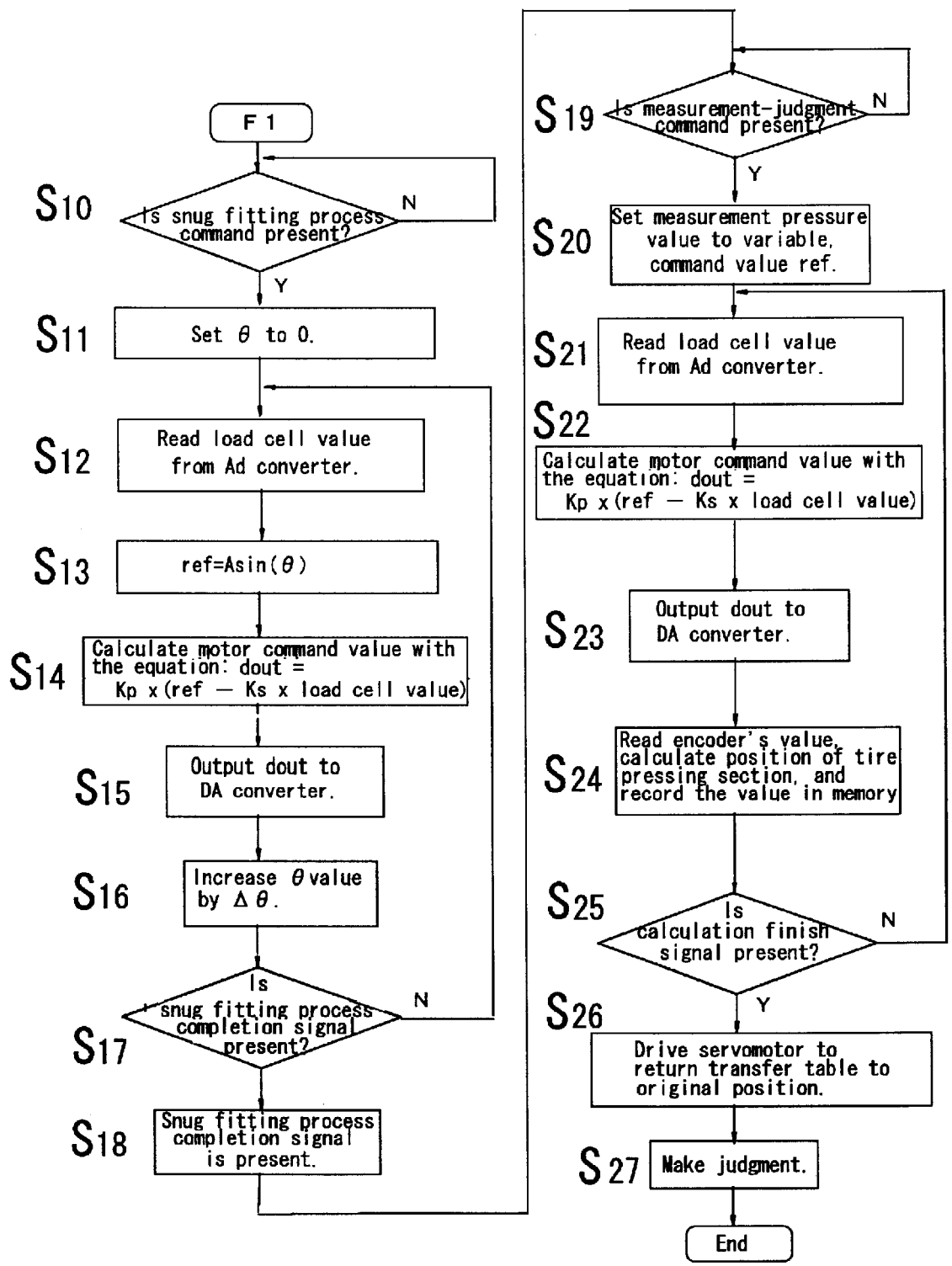
FIG. 14 is a flowchart of controlling the snug fitting process and measurement process with varying loads in any intended waveform applied to the ground contact surface F.

FIG. 14 is a flowchart showing the fitting, measurement, and judgment processes for the tire.

When a snug fit process command is sent from an upper rank controller (not shown), the variable θ is set to zero in the step S11. Next, in the step S12, a load cell value is read from the AD converter 7b. In the step S13, the value of θ is put into a function "sin" written as ref=A sin (θ). In the step S14, the value of "ref" is determined by multiplying with a preset amplitude A. The command value "dout" to the servomotor 17a is calculated as follows:

$$dout = Kp \times (ref - Ks \times load\ cell\ value)$$

The servomotor command value "dout" calculated with the above equation is outputted to the DA converter 7c in the step S15, to perform feedback control to bring the pressing force to the command value "ref." Next, in the step S17, the value of the variable θ is increased by Δθ. In case a snug fit process completion signal is not given from the upper rank controller (not shown), the process goes back to the step S12 of reading the load cell value from the AD converter. In this way, the steps S12 to S17 are repeated until a snug fit completion signal is present in the step S18.

Incidentally, while the snug fitting process is being performed, the tire assembly 1 is being rotated at a specified speed with the drive rollers 8.

Figure 16:
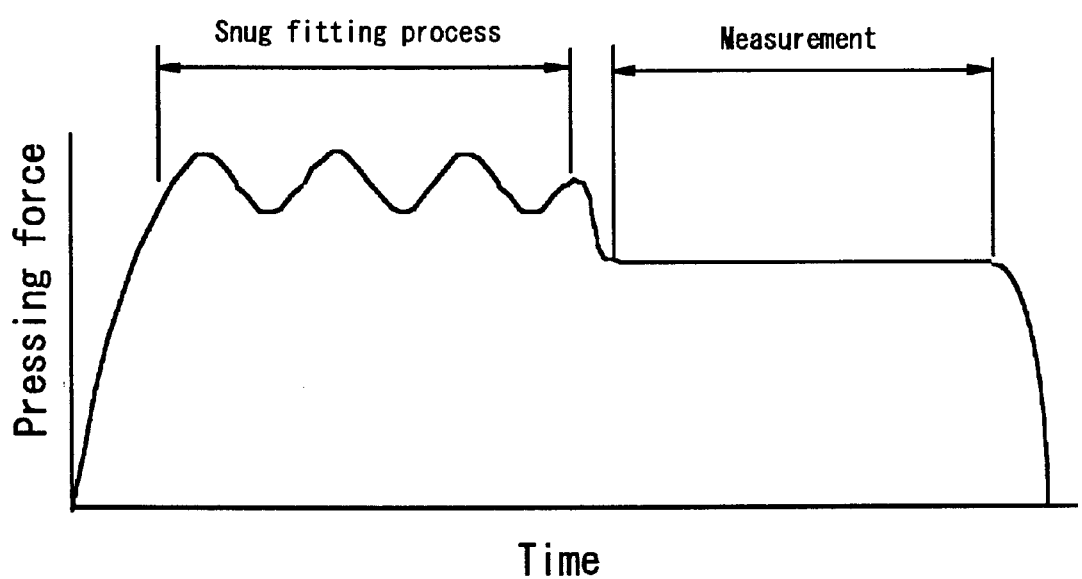
FIG. 16 is a graph of time versus pressure acting on the ground contact surface F of the tire when snug fitting process is performed with load varying in a since curve applied to the tire assembly 1.

With the above control, it is possible by setting the value of the variable θ in the step S13 to apply any intended load variation such as in a sine wave to the tire assembly. Such a load variation corresponding to that encountered with the actual vehicle is very effective for the snug fitting process of the tire assembly 1. FIG. 16 is a force-versus-time graph of a sine wave load applied to the tire assembly 1.

As described above, this control is arranged that the pressure pattern (ref=A sin (θ)) is stored and held for use in performing the snug fitting process. Therefore, snug fit between wheel and tire is realized correctly and quickly by applying varying load to the tire assembly according to the pre-stored pressure pattern data. The pressure pattern can be made to correspond to the load varying like that occurring when an actual vehicle is driven or varying like a sine wave. That is, snug fit between wheel and tire is realized quickly by giving the tire assembly 1 load that varies in a pattern very similar to that occurring when an actual vehicle is run.

The measurement-judgment control after completing the snug fitting process is performed in the steps S19 to S27 of the flowchart shown in FIG. 14.

First, in the step S19, a measurement-judgment command from an upper rank controller (not shown) is waited for. Incidentally, the tire assembly 1 is kept rotating since the previous step at a specified rotary speed with the drive rollers 8. In the step S20 when the measurement-judgment command comes, a pressure value for use in measurement is set to the command value "ref." Next, in the step S21, the value of the load cell 38 is read from the AD converter 7b. Based on that value, a command value to the servomotor 17a is calculated in the step S22 using the following equation.

dout=$K_p$×(ref−$K_s$×load cell value)

The "dout" value calculated with the above equation is outputted to the DA converter 7c in the step S23 to control the servomotor 17a so that a constant value pressure is applied to the ground contact surface F of the tire for measurement. In the step S24, the value of the encoder 17b is read, change in the relative position of the tire pressing section 23 (23') (press-in section 39 (39')) is calculated, and the calculated value is recorded in a memory 7f.

If the measurement-judgment command has not come from the upper rank controller (not shown), the process goes back to the step S21 of reading the value of the load cell 38 from the AD converter, and thereafter the same processes are repeated. When a measurement completion signal is sent and recognized in the step S27, the servomotor 17a is driven to return the transfer table 18 (18') to the original position.

Here, FIG. 16 is a graph showing the pressure acting on the ground contact surface F of the tire plotted against time when snug fitting process is performed by applying load varying in a sine curve pattern. As seen from the graph, varying pressure of the sine curve pattern is applied in the snug fitting process, and the pressure is held constant in the measurement process to detect the change in the relative position of the tire pressing section 23 (23').

Figure 17:
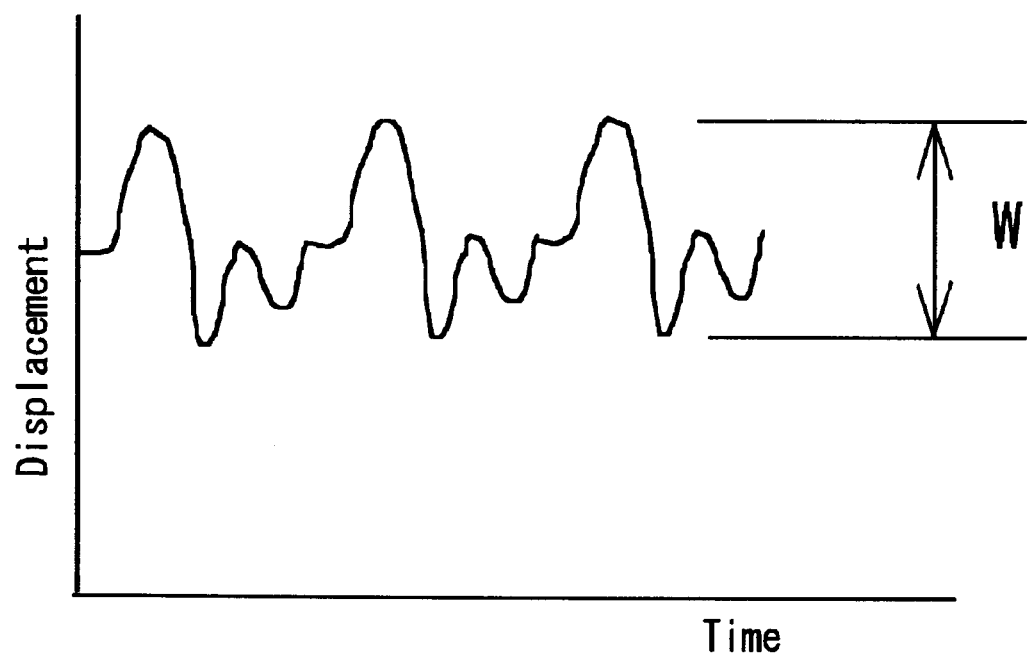
FIG. 17 is a waveform showing the change in the relative position of the pressing rollers 28.

FIG. 17 shows a wave pattern of change in the relative position of the tire pressing section 23 (23') stored in the memory 7f. The snug fit state of the tire assembly 1 is judged from the data of change in the relative position of the tire pressing section 23 (23') stored in the memory 7f.

The judgment is performed using various methods as described below.

First Method of Judgment

Judgment is made with the peak-to-bottom value of the raw data waveform. That is, as shown in FIG. 17, judgment is made with the difference W between the maximum and minimum values of the displacement.

Second Method of Judgment

A first-order component power of the displacement of the tire pressing section 23 (23') is determined and its peak-to-bottom value is used in judgment.

Third Method of Judgment

Figure 18:
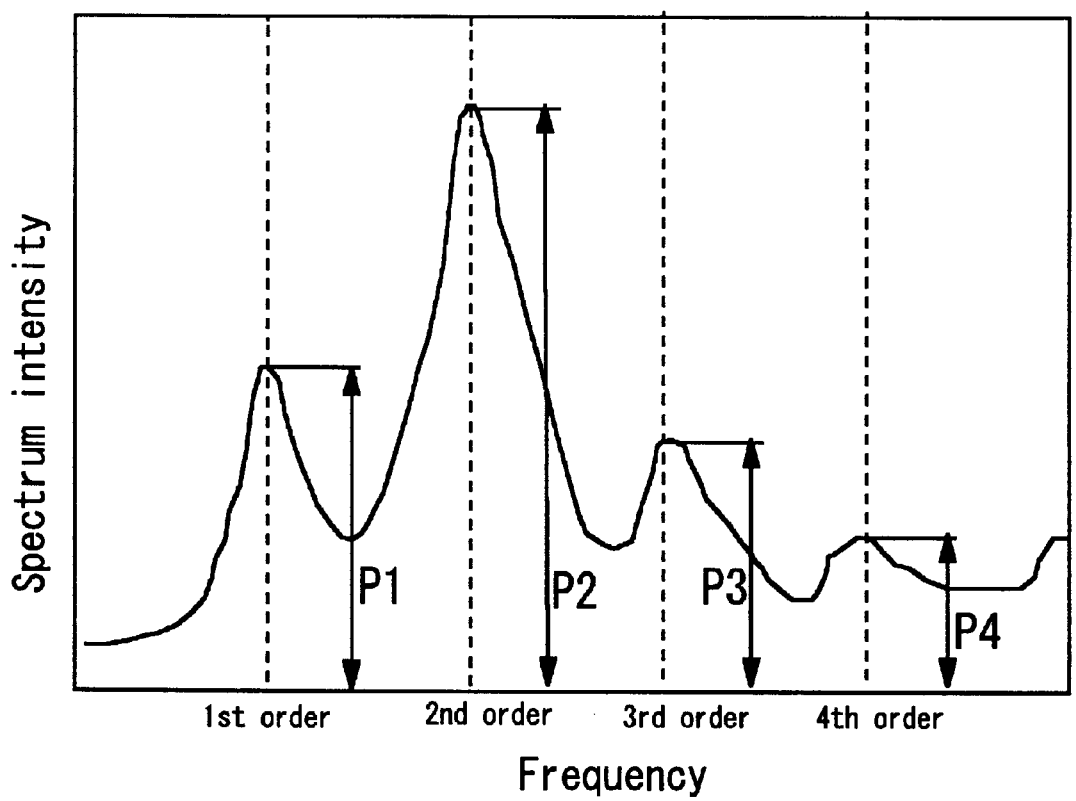
FIG. 18 is a graph of relationship between frequency and spectrum intensity in the third judgment method.

With this method, the displacement of the tire pressing section 23 (23') is subjected to the FFT (fast Fourier transform) process and the level of n-th order component of the tire rotation is comprehensively examined to make judgment. In concrete terms, as shown in FIG. 18, the displacement of the tire pressing section 23 (23') is subjected to the FFT process to measure the 1st to 4th order components of spectrum power (P1 to P4) of the of the tire rotation. Judgment values are calculated by multiplying specified weighting values (w1 to w4) with the spectrum power as; w1×P1+w2×P2+w3×P3+w4×P4. Acceptability is judged from whether the judgment value falls within a specified range.

Fourth Method of Judgment

Figure 19:
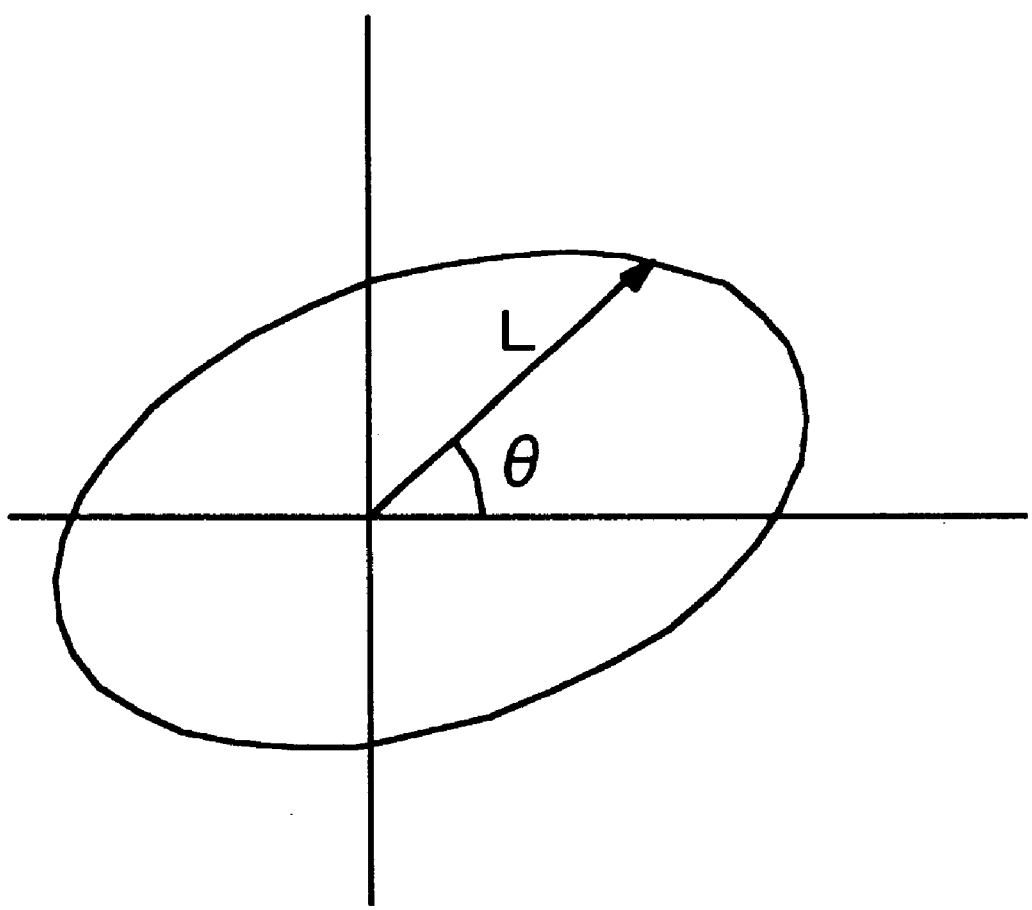
FIG. 19 is a conceptual view of a virtual tire shape acquired from the pressing roller displacement and the tire rotation phase angle α for use in the fourth judgment method.
Figure 20:
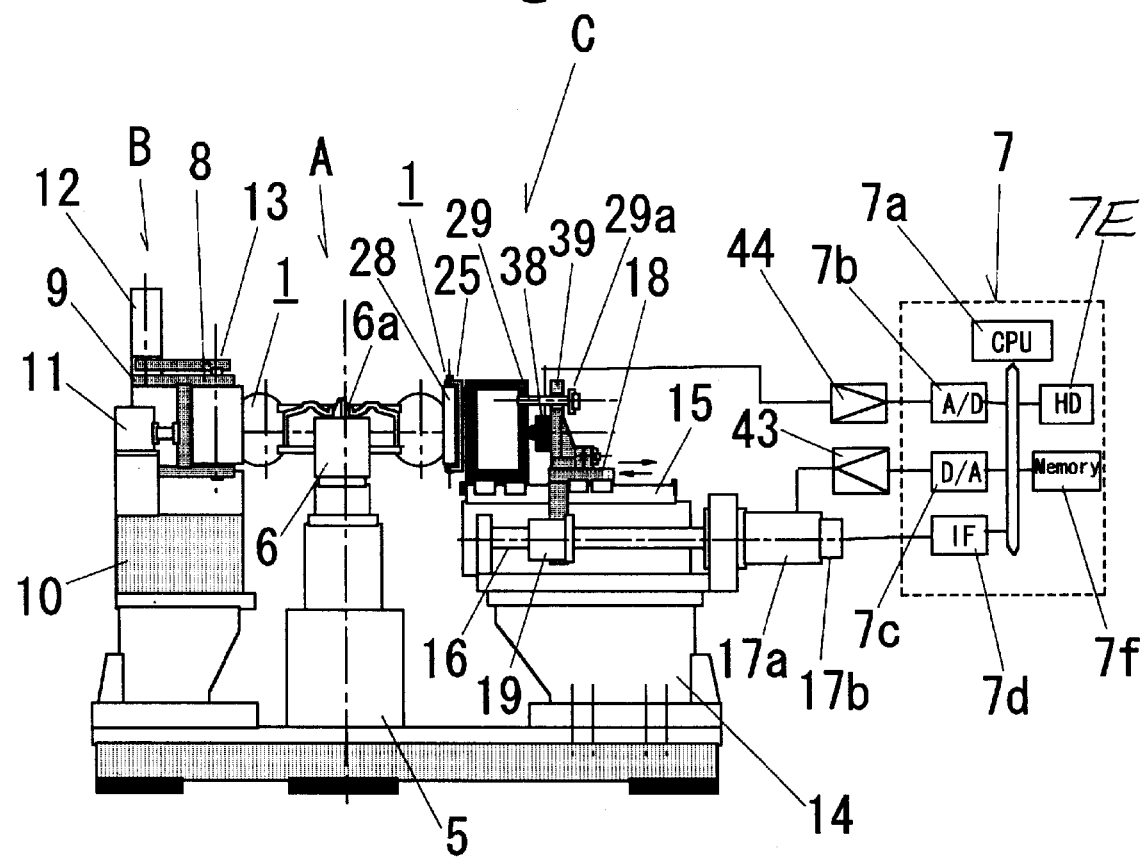
FIG. 20 is a general front view of a snug fitting apparatus provided with a snug fit measuring device C' according to a second embodiment of the invention.

With this method, a virtual tire shape is determined as shown in FIG. 19 from the displacement of the tire pressing section 23 (23') and the rotary phase angle θ of the tire, and judgment is made according to the circular accuracy of the virtual tire. The virtual tire shape as shown in FIG. 19 is determined by continuous measurement of the rotary phase angle θ of the tire assembly 1 and the distance L at that angle between the pressing roller and the rotation center of the tire.

Figure 24:
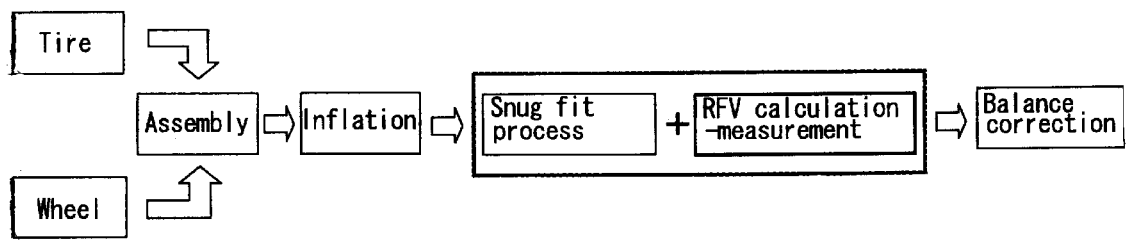
FIG. 24 shows the flow of manufacturing the tire assembly 1 using the RFV measurement-judgment process of this invention.
Figure 25:
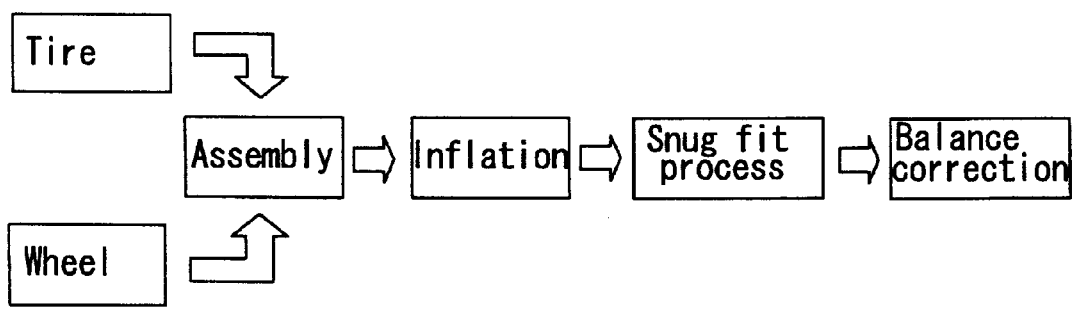
FIG. 25 shows the conventional flow of manufacturing the tire assembly.

A series of processes of snug fitting, measurement, and judgment of each of the above embodiments are performed as shown in FIG. 24 in the flow of manufacturing processes of the tire assembly 1. While the judgment in the conventional arrangement has been made by sampling, with the arrangement according to this invention, the judgment is performed for every tire assembly 1. Therefore, the RFV is assured for every item of the product and the tire assembly can be manufactured with high quality.

As described above, this invention is arranged to perform in succession the snug fitting process in which the first pressing member is pressed against the ground contact surface F of the tire assembly and the measurement process in which the second pressing member is pressed against the ground contact surface to receive the radial reactional force of the ground contact surface F or detect the displacement of the tire pressing section. Therefore, the following effects are provided:

1. A large-sized, expensive uniformity checking machine is unnecessary.

2. Unlike the means for inspecting the uniformity in various directions of the tire assembly taken out by sampling, since all the tire assemblies 1 are measured for the RFV on the line, quality is assured for all the tire assemblies 1 with high reliability. Even if tire assemblies 1 come out that are out of specifications, it is possible to take appropriate measures automatically such as to carry out again the snug fitting process or remove the unacceptable items from the line, without sacrificing the productivity, while remarkably improving the process quality of the tire assembly 1.

3. A full automation is possible and the work load is alleviated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A snug fitting apparatus for a tire assembly having a disk wheel and a tire fitted thereto and having a ground contact surface, comprising:

a rotary drive device for rotary driving the tire assembly supported on a work holding section, a first pressing member axially aligned with the rotary device for performing a snug fitting process by pressing the ground contact surface of the tire assembly, a second pressing member longitudinally aligned with the rotary device for coming into pressing contact with the ground contact surface of the tire assembly to receive a radial reactional force from the ground contact surface, a transfer device connected to the first and second pressing members for transferring each of the first and second pressing members between a pressing contact position where the pressing member is in pressing contact with the ground contact surface of the tire assembly and a release position where the pressing member is released from the pressing contact, pressure detecting means operatively coupled to the first and second pressing members for detecting the reactional force received by the second pressing member in the pressing contact position, and process control means operatively coupled to the first and second pressing members for performing in succession the process of snug fitting by moving the first pressing member with the transfer device and pressing the first pressing member against the ground contact surface of the tire assembly being rotated by the rotary drive device, a process of measuring a variation in the reactional force by the pressure detecting means by moving the second pressing member by the transfer device and pressing the second pressing member against the ground contact surface of the tire assembly being rotated by the rotary drive device, and a process of performing an RFV judgment based on the reactional force.

2. A snug fitting apparatus according to claim 1, wherein the transfer device is provided with a lock device for preventing the movement of a transfer table of the transfer device, and wherein the process control means performs a measurement process by pressing and holding the pressing member until a predetermined pressure is detected, preventing the movement of the transfer table at the time of detecting the predetermined pressure, rotating the tire assembly by operating the rotary drive device, and detecting with the pressure detecting means the variation in the reactional force of the tire assembly.

3. A snug fitting apparatus for a tire assembly having a disk wheel and a tire fitted thereto and having a ground contact surface, comprising:

a rotary drive device for rotary driving the tire assembly supported on a work holding section, a first pressing member axially aligned with the rotary device for performing a snug fitting process by pressing the ground contact surface of the tire assembly, a second pressing member longitudinally aligned with the rotary device for coming into pressing contact with the ground contact surface of the tire assembly to receive the radial reactional force of the ground contact surface, a transfer device connected to the first and second pressing members for transferring each of the first and second pressing members between a pressing contact position where the pressing member is in pressing contact with the ground contact surface of the tire assembly and a release position where the pressing member is released from the pressing contact, pressure detecting means operatively coupled to the first and second pressing members for detecting the reactional force received by the second pressing member in the pressing contact position, displacement measuring means for measuring the displacement of a tire pressing section, and process control means operatively coupled to the first and second pressing members for performing in succession the process of snug fitting by moving the first pressing member by the transfer device and pressing the first pressing member against the ground contact surface of the tire assembly being rotated with the rotary drive device, a process of measuring the displacement of the second pressing member by the pressure detecting means by moving the second pressing member by the transfer device and pressing the second pressing member with its pressing force held constant against the ground contact surface of the tire assembly being rotated with the rotary drive device, and a process of performing an RFV judgment based on the displacement.

4. A snug fitting apparatus according to claim 3, wherein the RFV judgment is performed with a peak-to-bottom value of the displacement with a constant pressure applied to the tire assembly.

5. A snug fitting apparatus according to claim 3, wherein the RFV judgment is performed by subjecting to an FFT process the displacement measured with a constant pressure on the tire assembly and by examining an n th component of the FFT process.

6. A snug fitting apparatus according to claim 3, wherein the RFV judgment is made with a circular accuracy of a virtual tire shape obtained from the displacement data measured with a constant pressure on the tire assembly.

7. A snug fitting apparatus according to claim 3 wherein the process control means is provided with control contents adapted to redo the snug fitting process when the RFV judgment proves a failure.

8. A snug fitting apparatus according to claim 3, wherein the first pressing member comprises a support member supporting rotatably side by side close to each other a plurality of pressing rollers having a slip angle to apply a lateral force to the ground contact surface of the tire assembly by pressing the rollers against the ground contact surface of the tire assembly.

9. A snug fitting apparatus according to claim 3, wherein the first pressing member serves also as the second pressing member.

10. A snug fitting apparatus according to claim 3, wherein the transfer device is arranged that the pressing members are attached to the transfer table which is mounted by screw engagement on a feed screw shaft rotated as driven with a servomotor to make it possible to stop the transfer table at any intended position.

11. A snug fitting apparatus according to claim 3, wherein the pressure detecting means is arranged that the tire pressing section is supported to be movable in the direction parallel to the transfer table movement direction on the transfer table moved with the transfer device in the tire pressing direction, the pressing members are secured to the tire pressing section, and a load cell is radially held between the transfer table and the tire pressing section to detect with the load cell the reactional force of the pressing member relative to the transfer table.

12. A snug fitting apparatus according to claim 3, wherein the pressure detecting means comprises; the tire pressing section with the pressing members attached to be moved with the transfer device in the tire pressing direction, a press in section which moves along the direction of the movement of the tire pressing section in the state of being capable of moving to and from the tire pressing section within a specified distance and presses the tire pressing section when driven with a drive means, and a load cell interposed between the tire pressing section and the press in section to detect with the load cell the reactional force of the tire pressing section relative to the press in section.

13. A snug fitting apparatus according to claim 12 wherein the tire pressing section with pressing members attached and the press-in section are respectively attached to a same sliding mechanism guided in the tire pressing direction to make it possible for the tire pressing section and the press-in section to slide in the tire pressing direction in the state of being capable of moving to and from each other within a specified distance, and the load cell is interposed between the tire pressing section and the press-in section.

14. A snug fitting process apparatus according to claim 3, comprising means for storing a pressing pattern for the tire snug fitting process to perform the snug fitting process according to the stored pressing pattern.

15. A snug fitting apparatus according to claim 14, wherein the pressing pattern corresponds to the load change occurring on the tire when a vehicle is actually run or to the load change occurring in a sine wave manner.

16. A snug fitting process apparatus according to claim 1, wherein the process control means is provided with control contents adapted to redo the snug fitting process when the RFV judgment proves a failure.

17. A snug fitting process apparatus for a tire assembly according to claim 1, wherein the first pressing member comprises a support member supporting rotatably side by side close to each other a plurality of pressing rollers having a slip angle to apply a lateral force to the ground contact surface of the tire assembly by pressing the rollers against the ground contact surface of the tire assembly.

18. A snug fitting apparatus according to claim 1, wherein the first pressing member serves also as the second pressing member.

19. A snug fitting apparatus according to claim 1, wherein the transfer device is arranged that the pressing members are attached to the transfer table which is mounted by screw engagement on a feed screw shaft rotated as driven with a servomotor to make it possible to stop the transfer table at any intended position.

20. A snug fitting apparatus according to claim 1, wherein the pressure detecting means is arranged that the tire pressing section is supported to be movable in the direction parallel to the transfer table movement direction on the transfer table moved with the transfer device in the tire pressing direction, the pressing members are secured to the tire pressing section, and a load cell is radially held between the transfer table and the tire pressing section to detect with the load cell the reactional force of the pressing member relative to the transfer table.

21. A snug fitting apparatus according to claim 1, wherein the pressure detecting means comprises; the tire pressing section with the pressing members attached to be moved with the transfer device in the tire pressing direction, a press in section which moves along the direction of the movement of the tire pressing section in the state of being capable of moving to and from the tire pressing section within a specified distance and presses the tire pressing section when driven with a drive means, and a load cell interposed between the tire pressing section and the press in section to detect with the load cell the reactional force of the tire pressing section relative to the press in section.

22. A snug fitting apparatus according to claim 21 wherein the tire pressing section with pressing members attached and the press-in section are respectively attached to a same sliding mechanism guided in the tire pressing direction to make it possible for the tire pressing section and the press-in section to slide in the tire pressing direction in the state of being capable of moving to and from each other within a specified distance, and the load cell is interposed between the tire pressing section and the press-in section.

23. A snug fitting process apparatus according to claim 1, comprising means for storing a pressing pattern for the tire snug fitting process to perform the snug fitting process according to the stored pressing pattern.

24. A snug fitting apparatus according to claim 23, wherein the pressing pattern corresponds to the load change occurring on the tire when a vehicle is actually run or to the load change occurring in a sine wave manner.

* * * * *